June 14, 1949.    R. BIRMANN    2,473,356
COMBUSTION GAS TURBINE ARRANGEMENT
Filed April 18, 1942    16 Sheets-Sheet 3
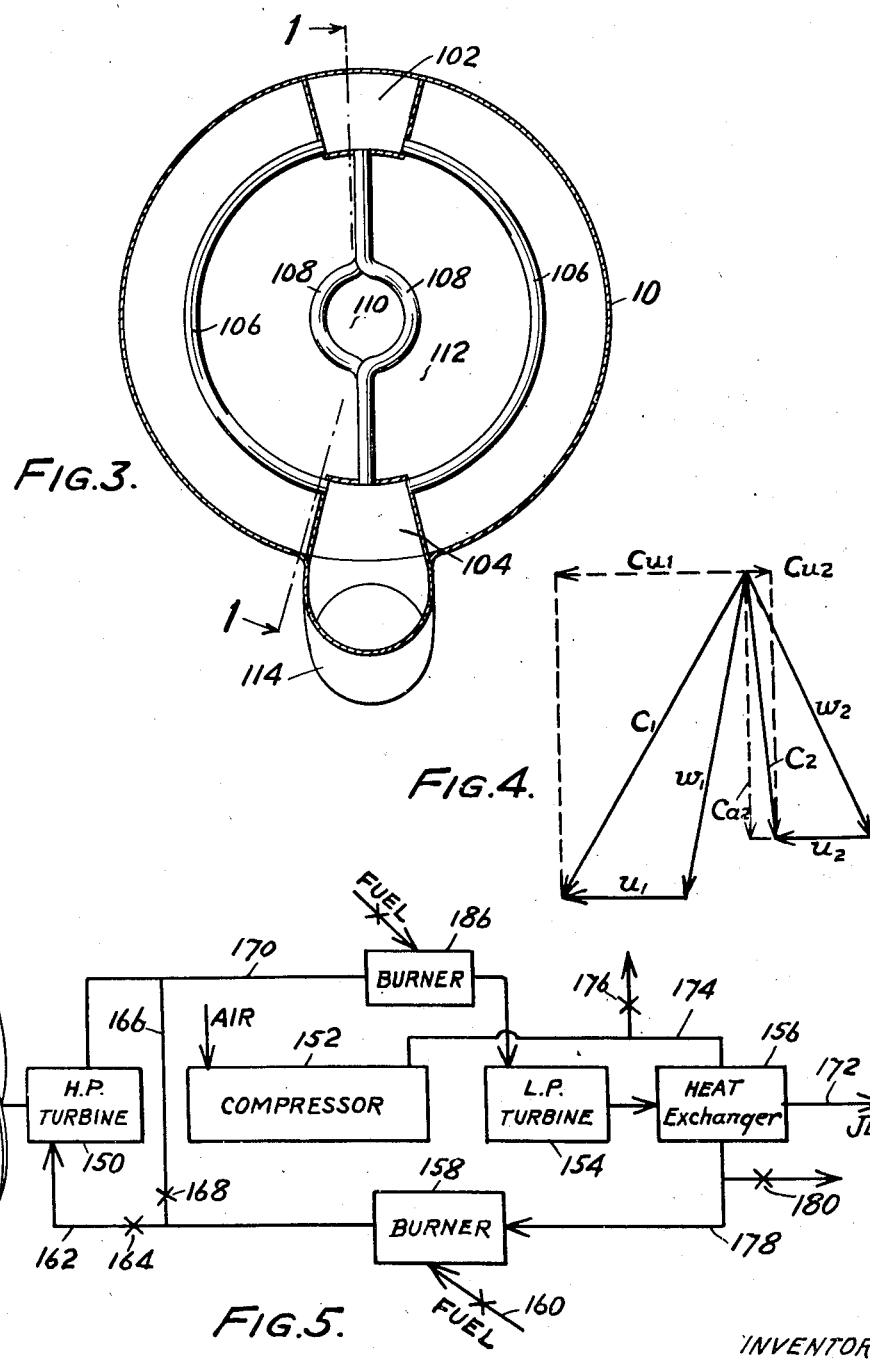
INVENTOR
Rudolph Birmann
BY
ATTORNEYS.
WITNESS:

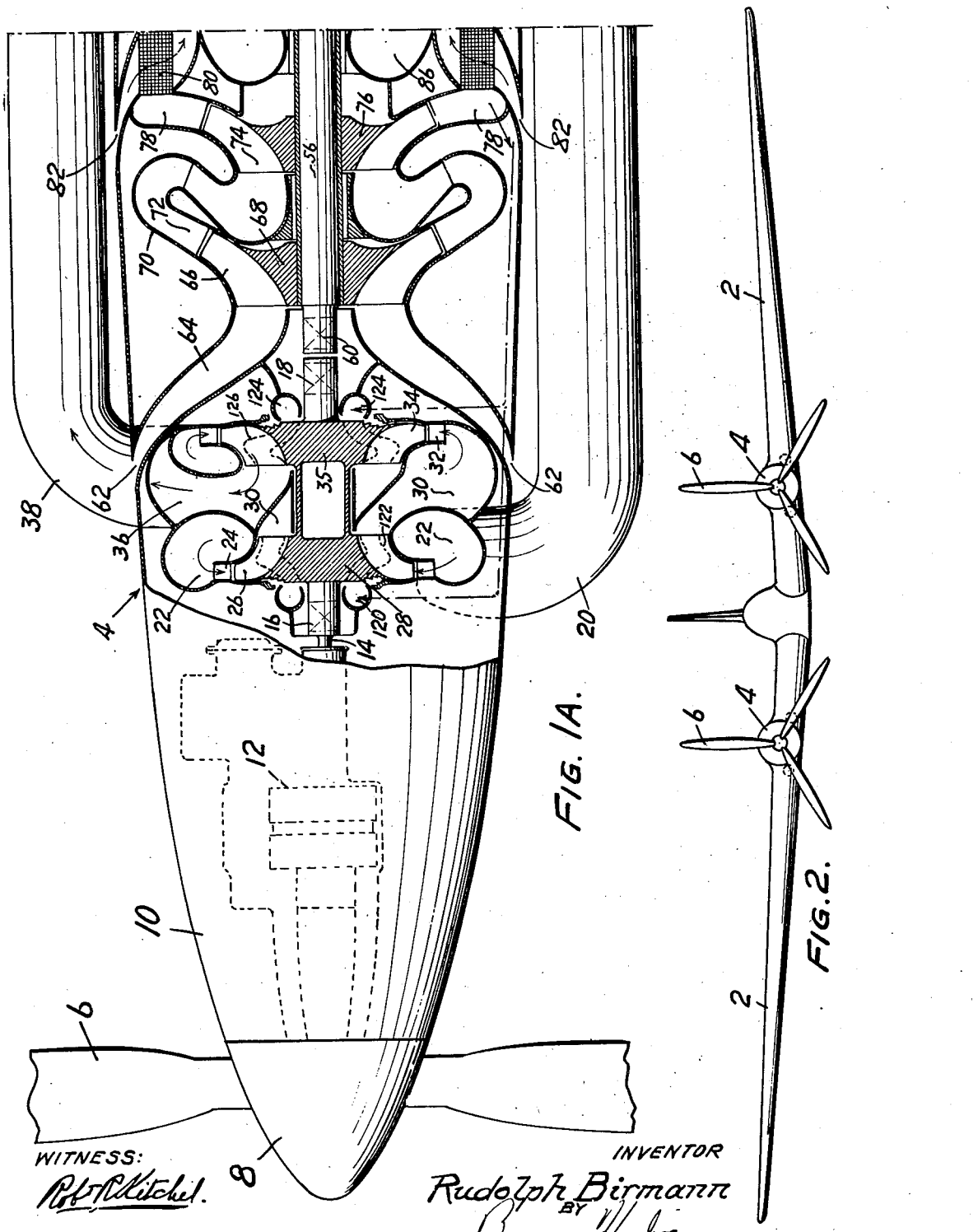
June 14, 1949.   R. BIRMANN   2,473,356
COMBUSTION GAS TURBINE ARRANGEMENT
Filed April 18, 1942   16 Sheets-Sheet 1

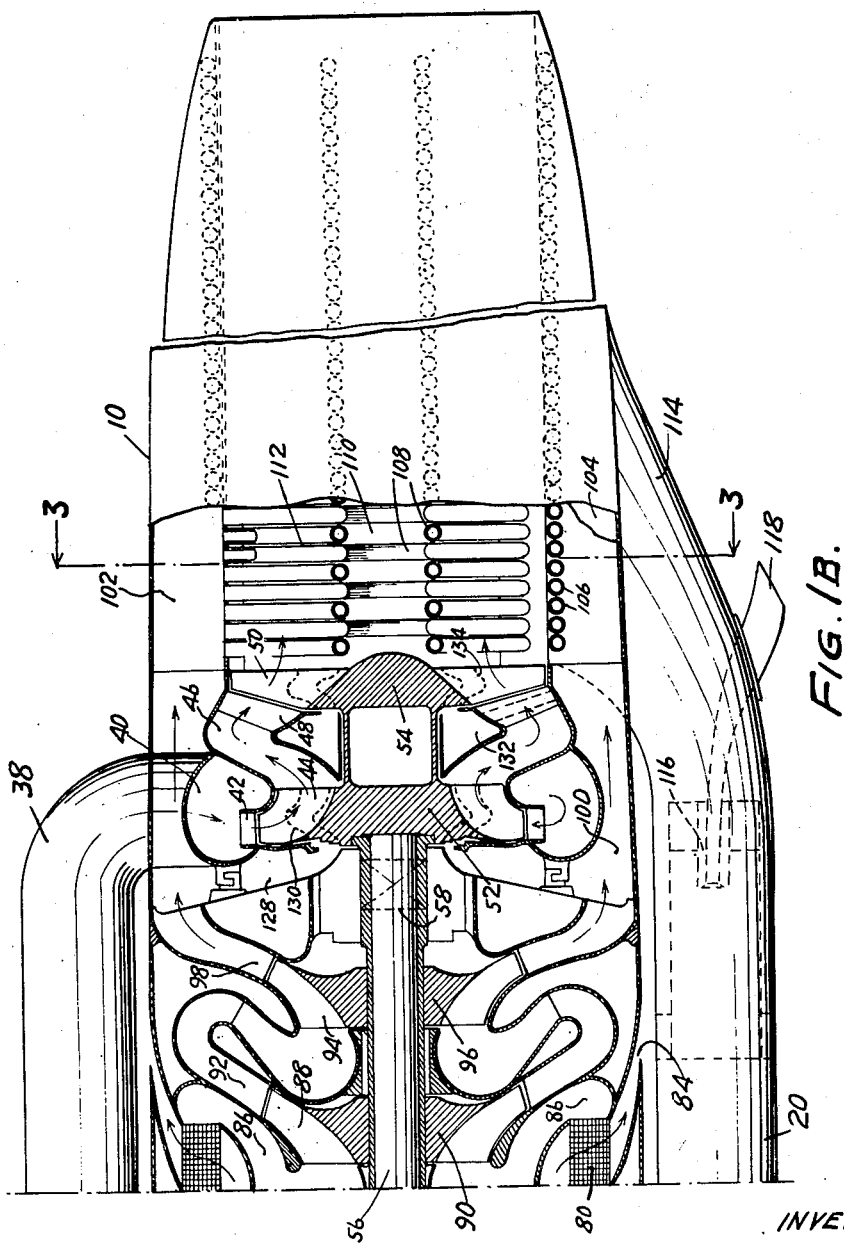
FIG. IB.

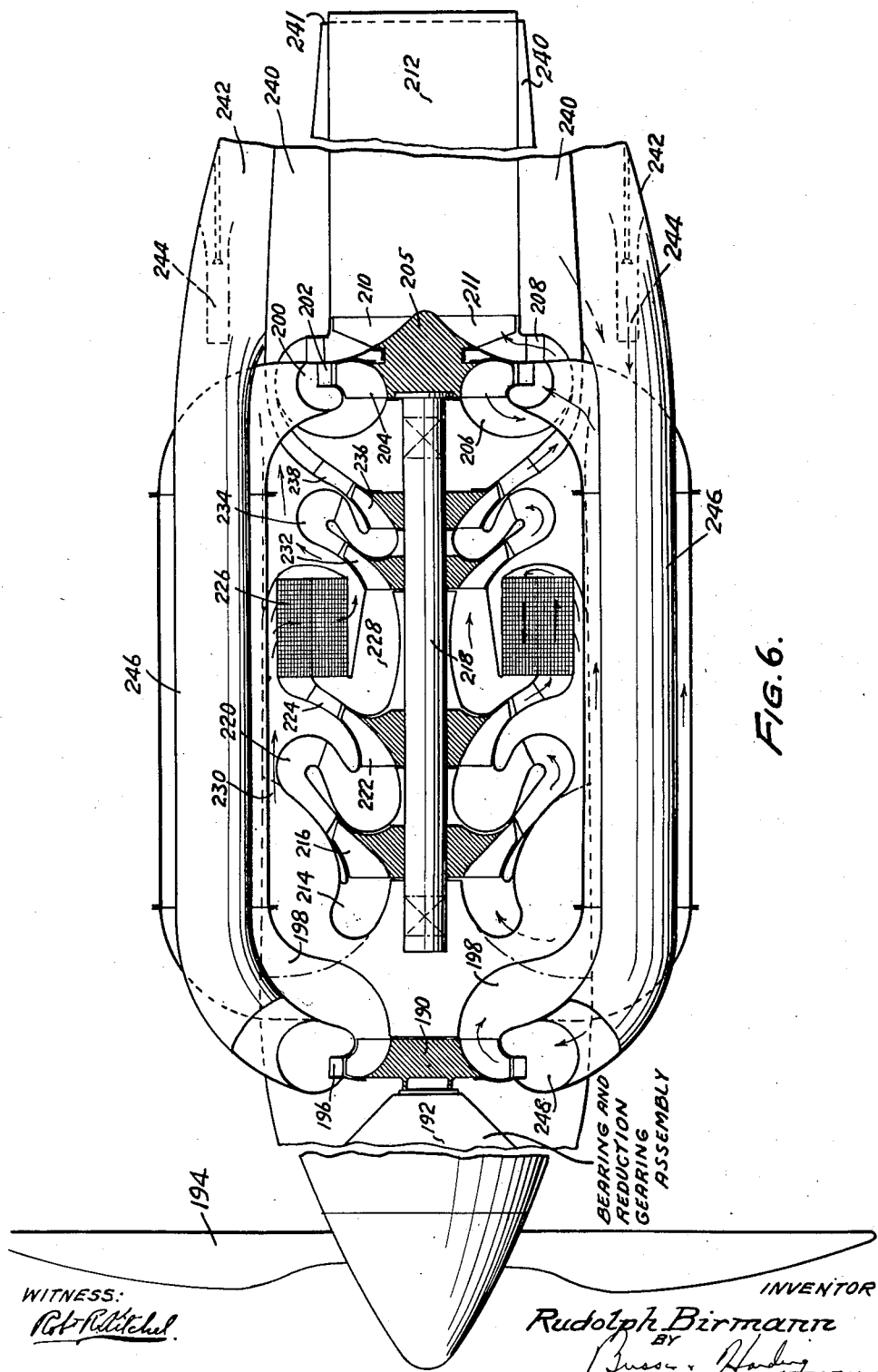

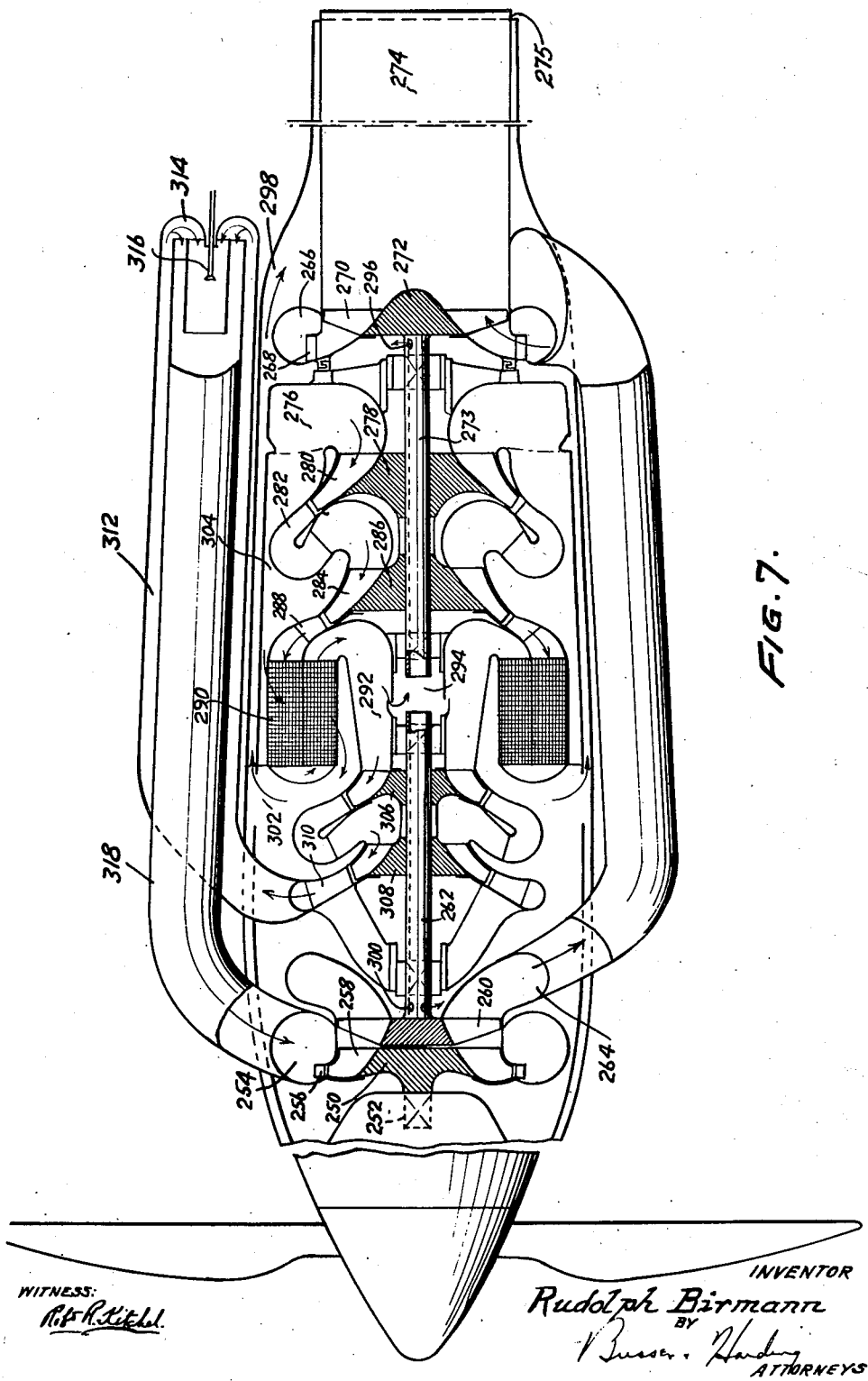

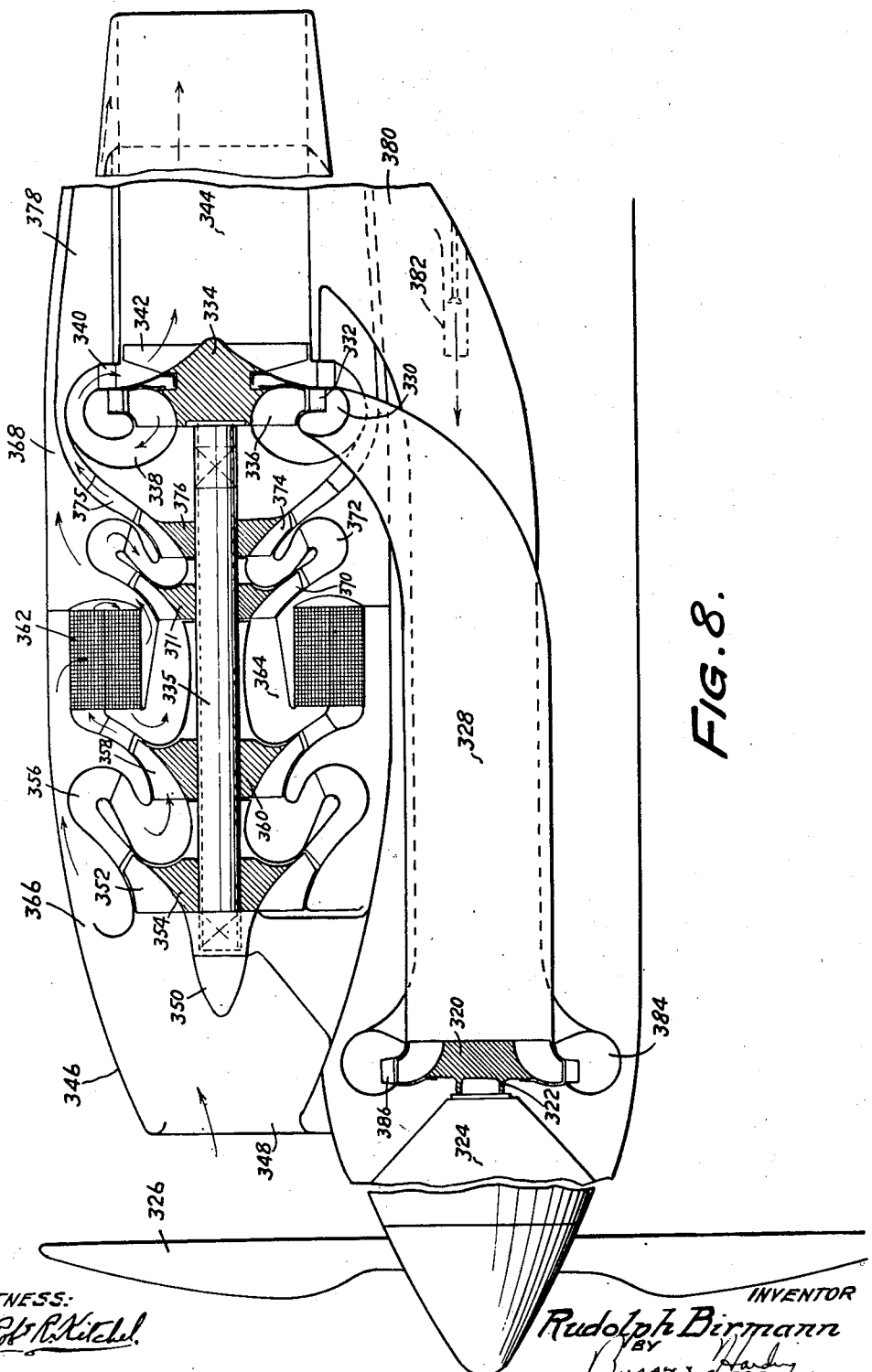

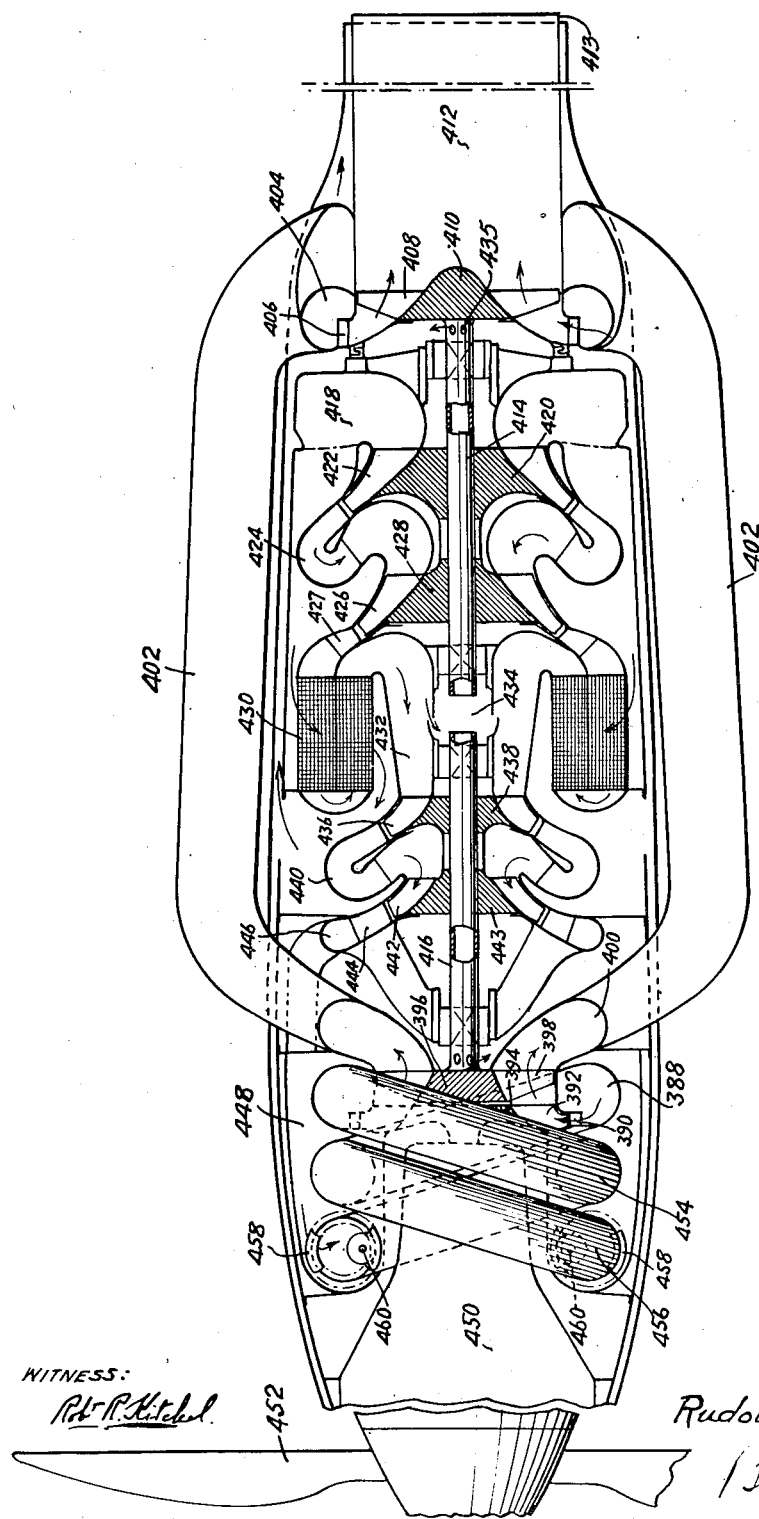

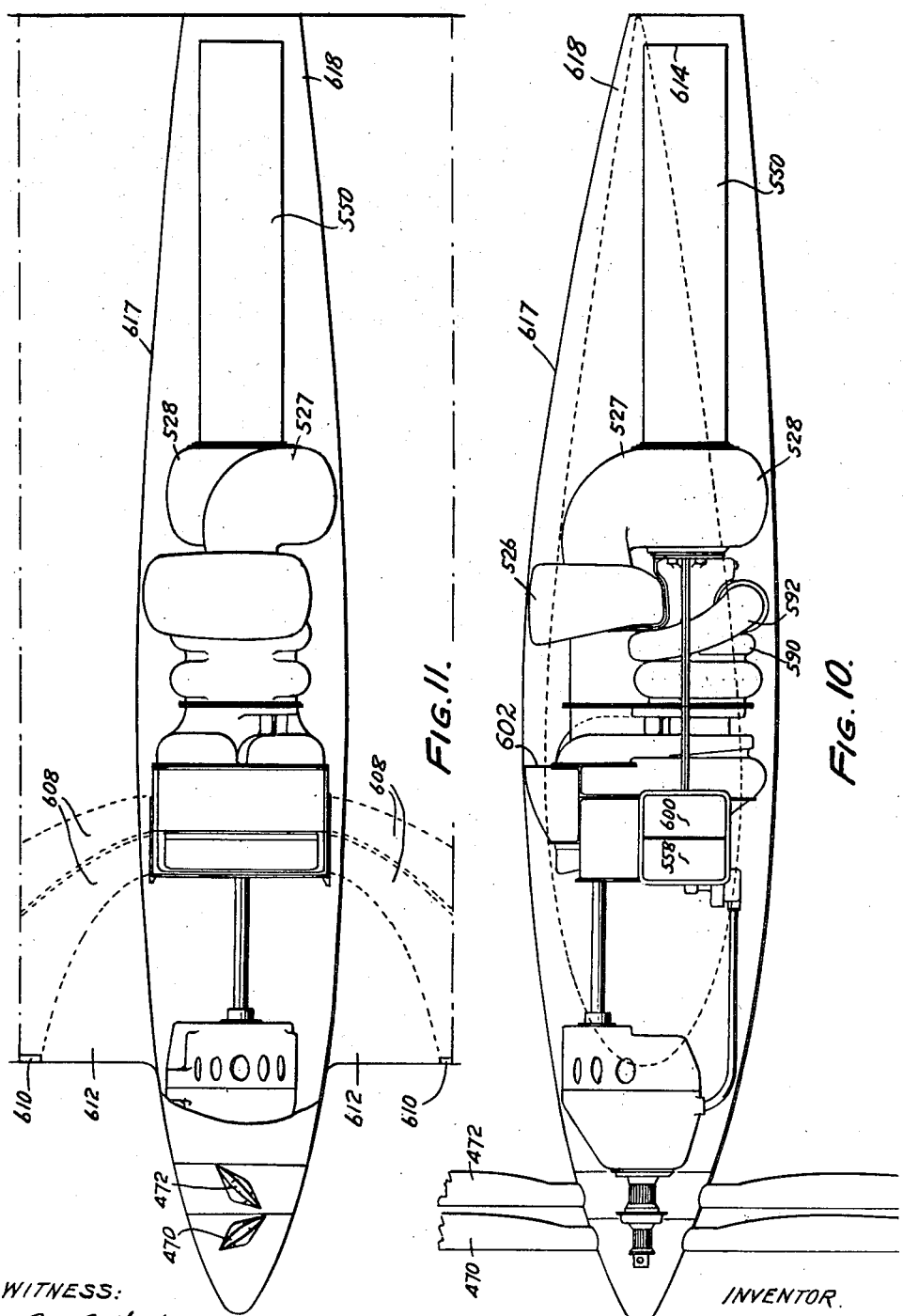

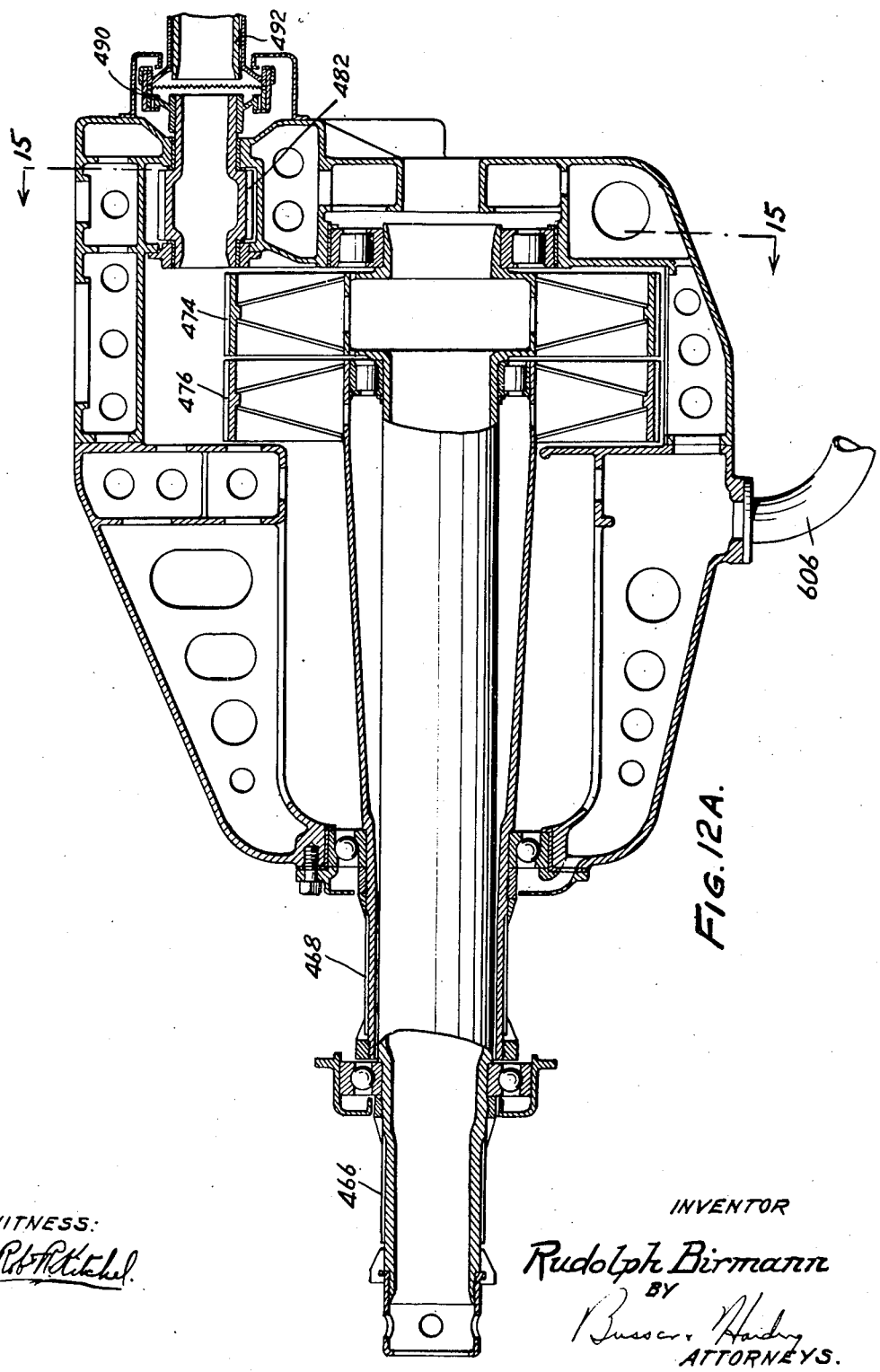

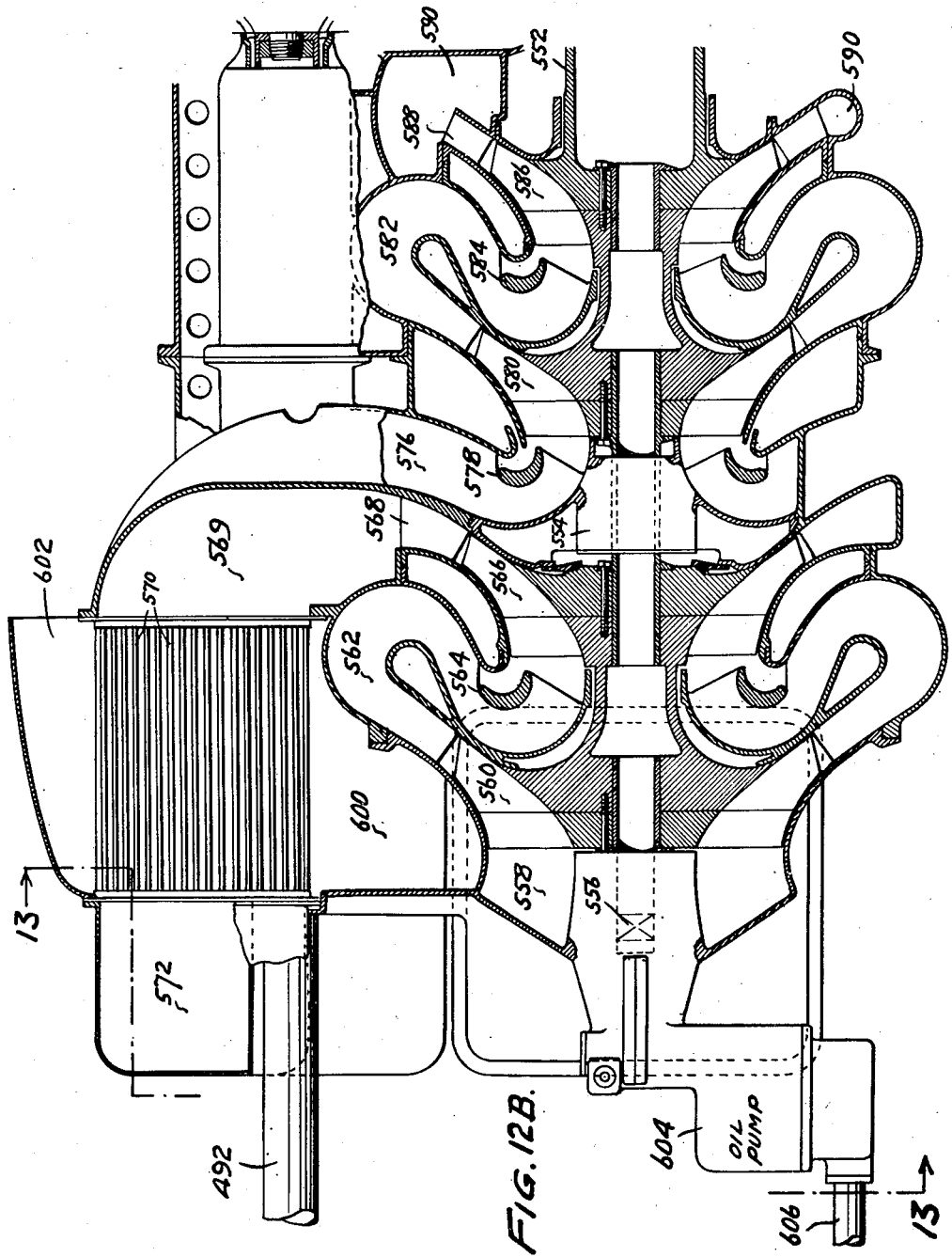

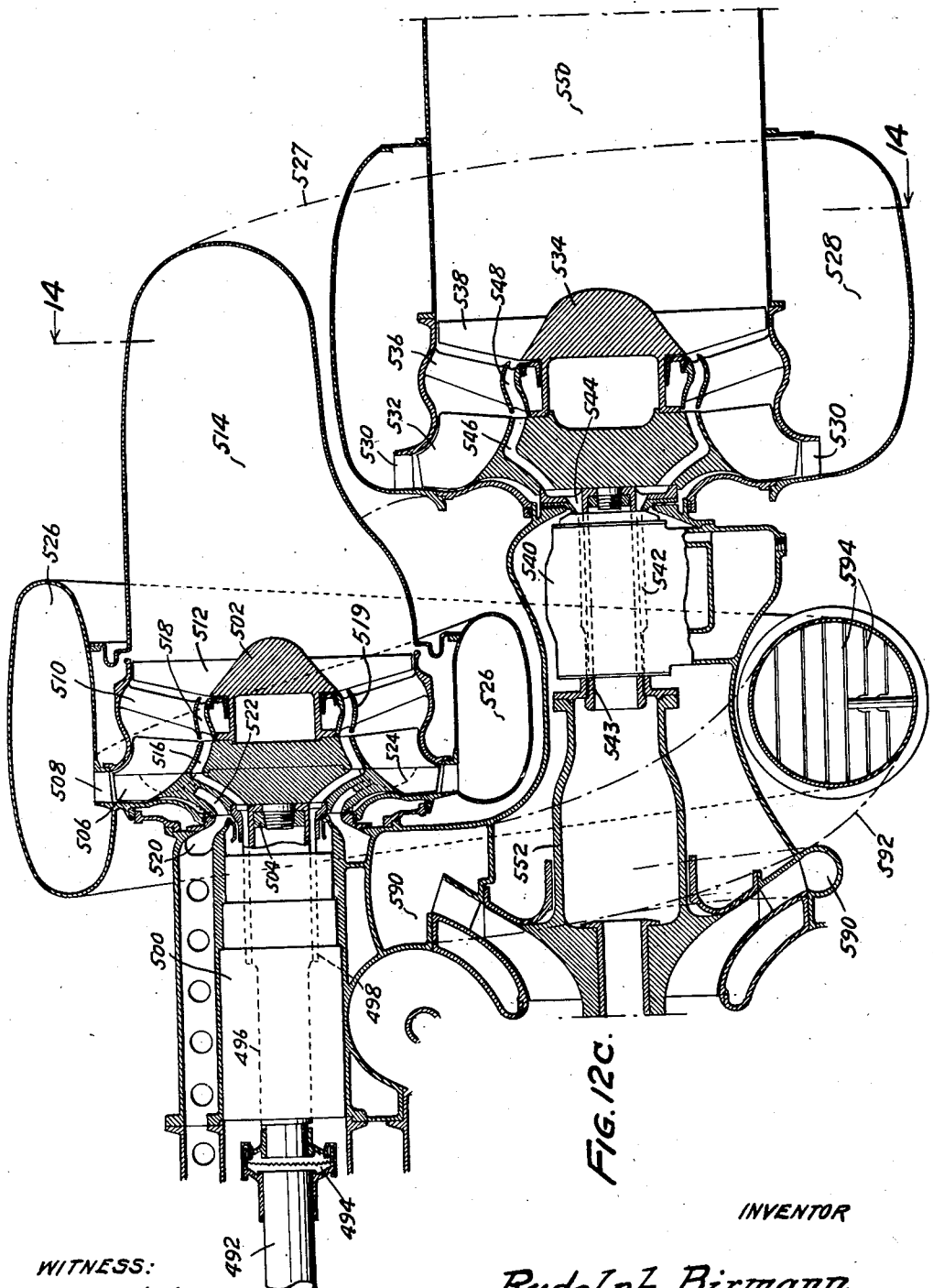

INVENTOR
Rudolph Birmann
BY
Susser & Harding
ATTORNEYS.

WITNESS:

Patented June 14, 1949

2,473,356

UNITED STATES PATENT OFFICE 2,473,356

COMBUSTION GAS TURBINE ARRANGEMENT

Rudolph Birmann, Newtown, Pa., assignor, by mesne assignments, to Turbo Engineering Corporation, a corporation of Delaware Application April 18, 1942, Serial No. 439,569

2 Claims. (Cl. 60—41)

1

This invention relates to a turbine unit adapted primarily for the propulsion of aircraft, though it will be evident that features of the unit are applicable for other power producing purposes. The unit is particularly designed to convert the heat energy obtained by combustion of fuel directly into mechanical energy by expansion of the combustion gases in a turbine, without the intermediate use of an engine, though it will be obvious that various features of the invention are applicable to the use of exhaust gases from an internal combustion engine to drive a turbine to effect supercharging or other end.

The various objects of the invention relate primarily to the arrangements of the parts of a unit of the type described and to the control therefor to secure an efficient and practical operation, particularly for aircraft or other high speed propulsion.

One object of the invention is the provision of a unit in which two separate turbines are provided for propulsion and for the driving of a compressor arranged to supply air under pressure to support the combustion of fuel. In the most desirable embodiment of the invention, the unit is adapted to operate independently of an internal combustion engine, fuel being burned in a stream of compressed air to produce products of combustion to drive the pair of turbines. In such an arrangement, the turbine driving the air compressor desirably runs continuously and more or less uniformly independently, at least so far as mechanical connections are involved, of the turbine adapted to drive a propeller or otherwise produce mechanical power. In accordance with the invention, the main and auxiliary turbines may be compounded in series, the former constituting the high pressure turbine and the latter a low pressure turbine receiving its driving gases from the former. By providing independent turbines as described, full and free control over the main turbine is possible without considering the auxiliary turbine and its functions, so that the highest freedom for maneuverability of the aircraft is obtained.

In the present specification the high pressure turbine drives a propeller and is the primary power turbine, while the low pressure turbine or turbines drive a compressor arrangement and

2 give rise to a high velocity propulsion jet. This arrangement may be reversed, however, and my copending application, Serial No. 439,570, filed April 18, 1942, now Patent No. 2,428,830, issued October 14, 1947, relates to this alternative. Numerous features of the invention are common to both alternatives and are claimed herein.

A further object of the invention is the utilization of the final exhaust gases for aiding, or even taking a primary part, in the driving of the aircraft by causing them to issue from the unit in the form of a high velocity jet. To achieve this end, the last turbine stage desirably consists of a wheel of a semiaxial flow type, inefficient dynamically from the usual viewpoints of turbine practice, but capable of effecting discharge of the gases at very high velocity.

A further object of the invention relates to the arrangement of a plurality of stages in the high pressure turbine to secure not only a compact arrangement, but proper cooling provisions. In accordance with the invention, however, a single stage high pressure turbine may be provided and a plurality of mechanically independent lower pressure turbines driving separate compressor stages.

In the preferred form of the invention, a compressor having a plurality of stages to secure a high compression ratio is employed. The entry of air to supply the compressor is effected at high velocity from the slip stream of the propeller or the stream of air flowing relative to the plane, and this velocity energy is converted into pressure energy to aid in securing a high degree of compression. In some cases, intercooling is desirable between stages of the compressor. Various objects of the invention relate to these features.

A further object of the invention is the provision of heat transfer between the hot turbine gases leaving the turbine and the air flowing to a combustion device where its temperature is further increased to the final working temperature. This preheating of the air results in the requiring of less fuel to attain the final temperature.

Still other objects of the invention relate to matters of control and regulation of the various parts to take care of varying conditions of operation and idling. In accordance with the invention, heat may be further introduced between the high and low pressure stages of the turbine arrangement.

These and other objects of the invention, some particularly relating to advantageous arrangements of parts, will become apparent from the following description, read in conjunction with the accompanying drawings, in which:

Figures 1A and 1B are respective elevations, partly in section, of the forward and rearward portions of a unit embodying the principles of the invention, the section at the rear portion of Figure 1B being taken on the broken plane indicated at 1—1 in Figure 3;

Figure 2 is an elevation of an airplane showing the fashion in which the units are embodied therein;

Figure 3 is a transverse section taken on the plane the trace of which is indicated at 3—3 in Figure 1B;

Figure 4 is a diagram illustrating the flow characteristics in the last turbine stage;

Figure 5 is a block diagram illustrating the control features of the unit involving the features of Figures 1A, 1B and 3;

Figure 13:
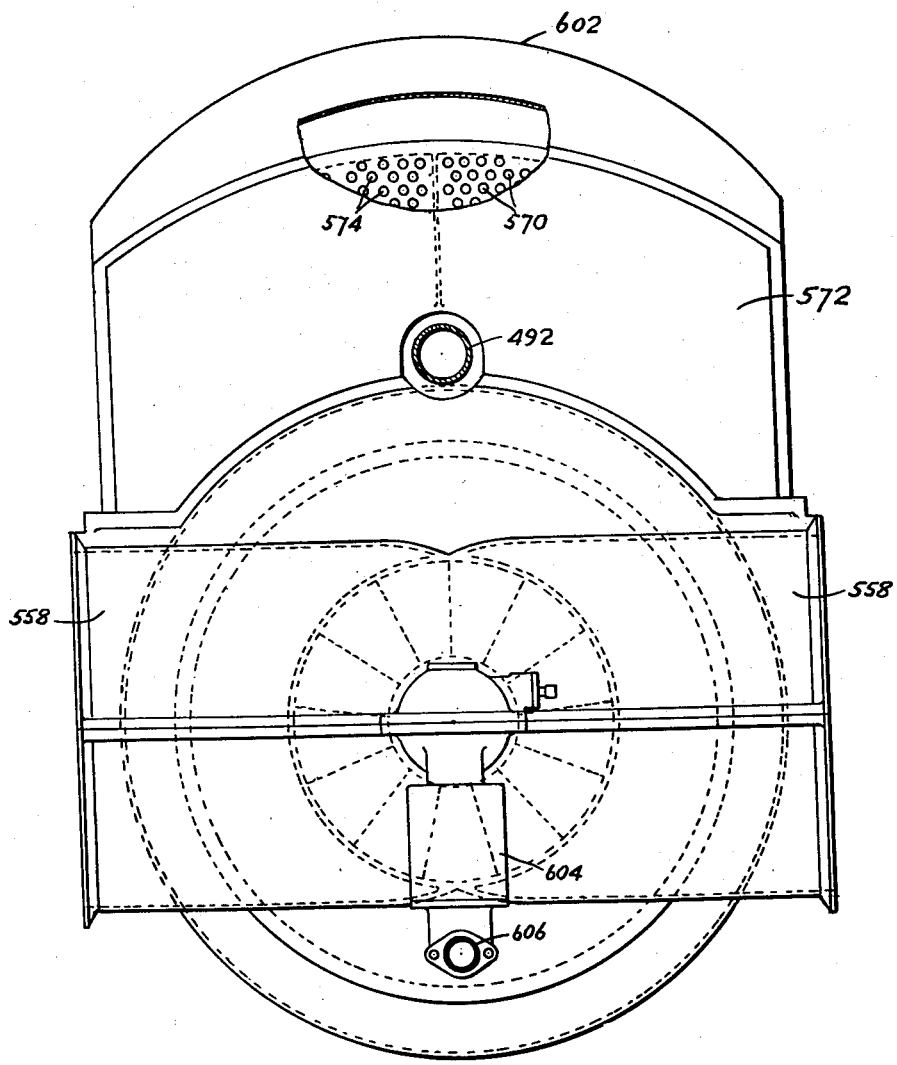
Figure 14:
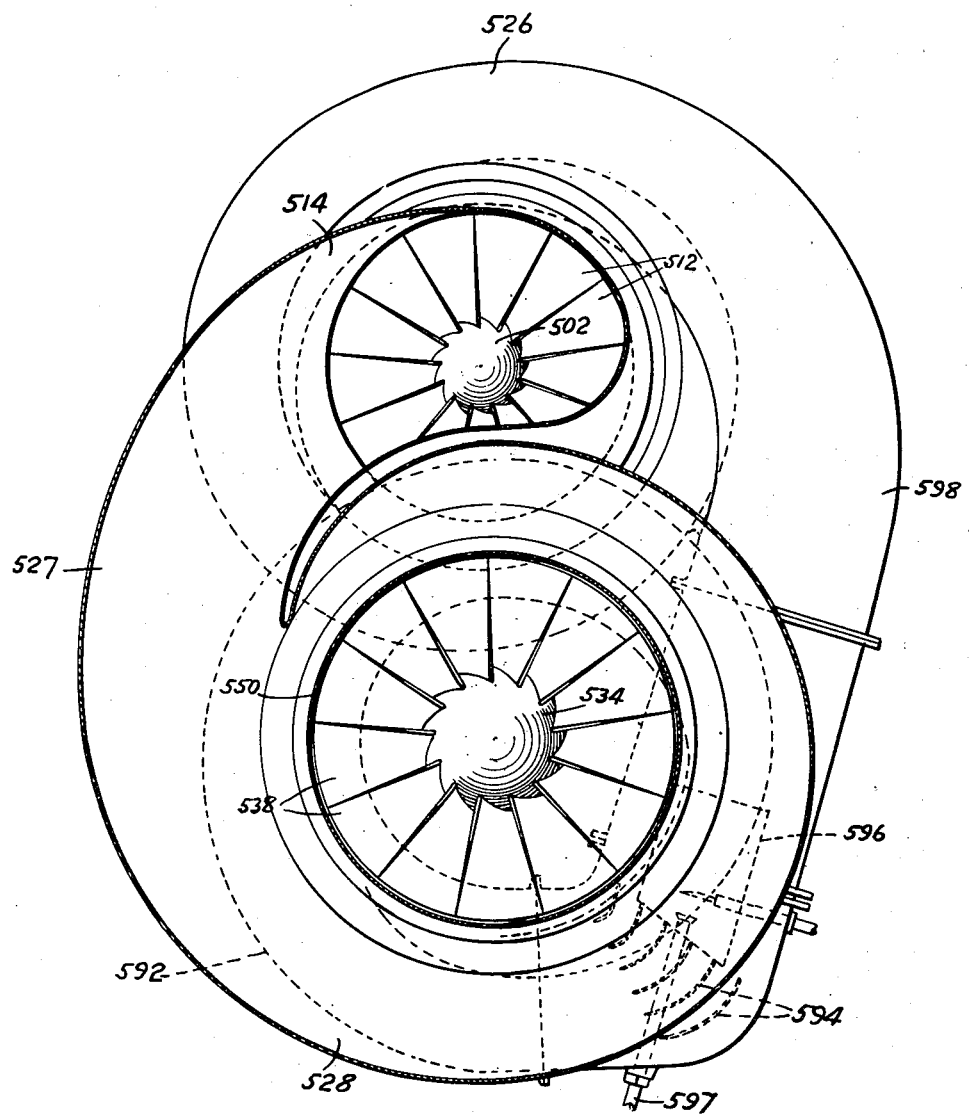
Figure 16:
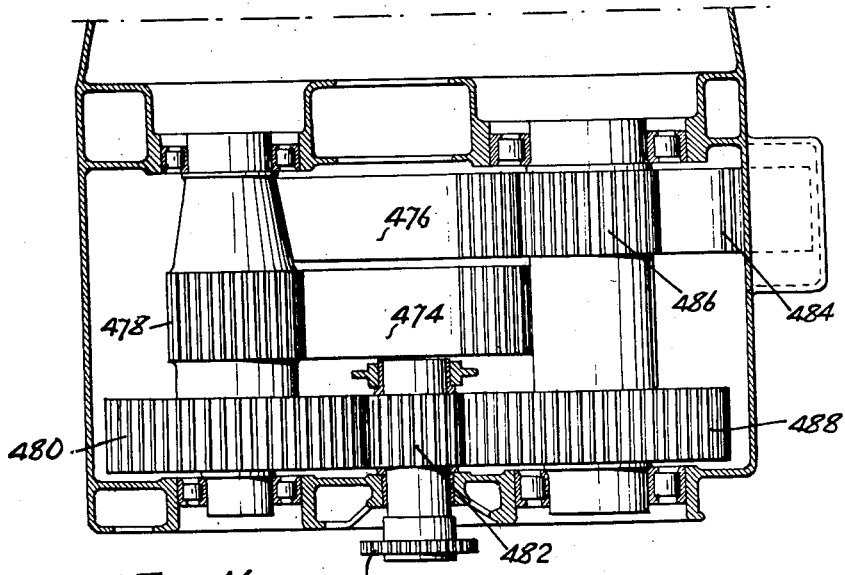
Figure 15:
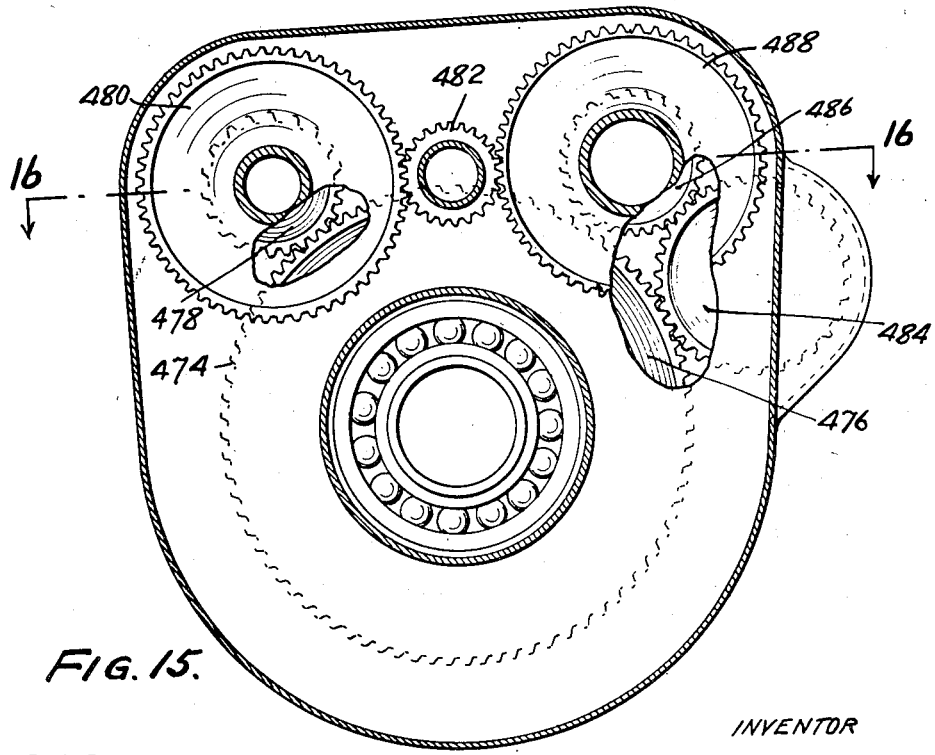
Figure 17:
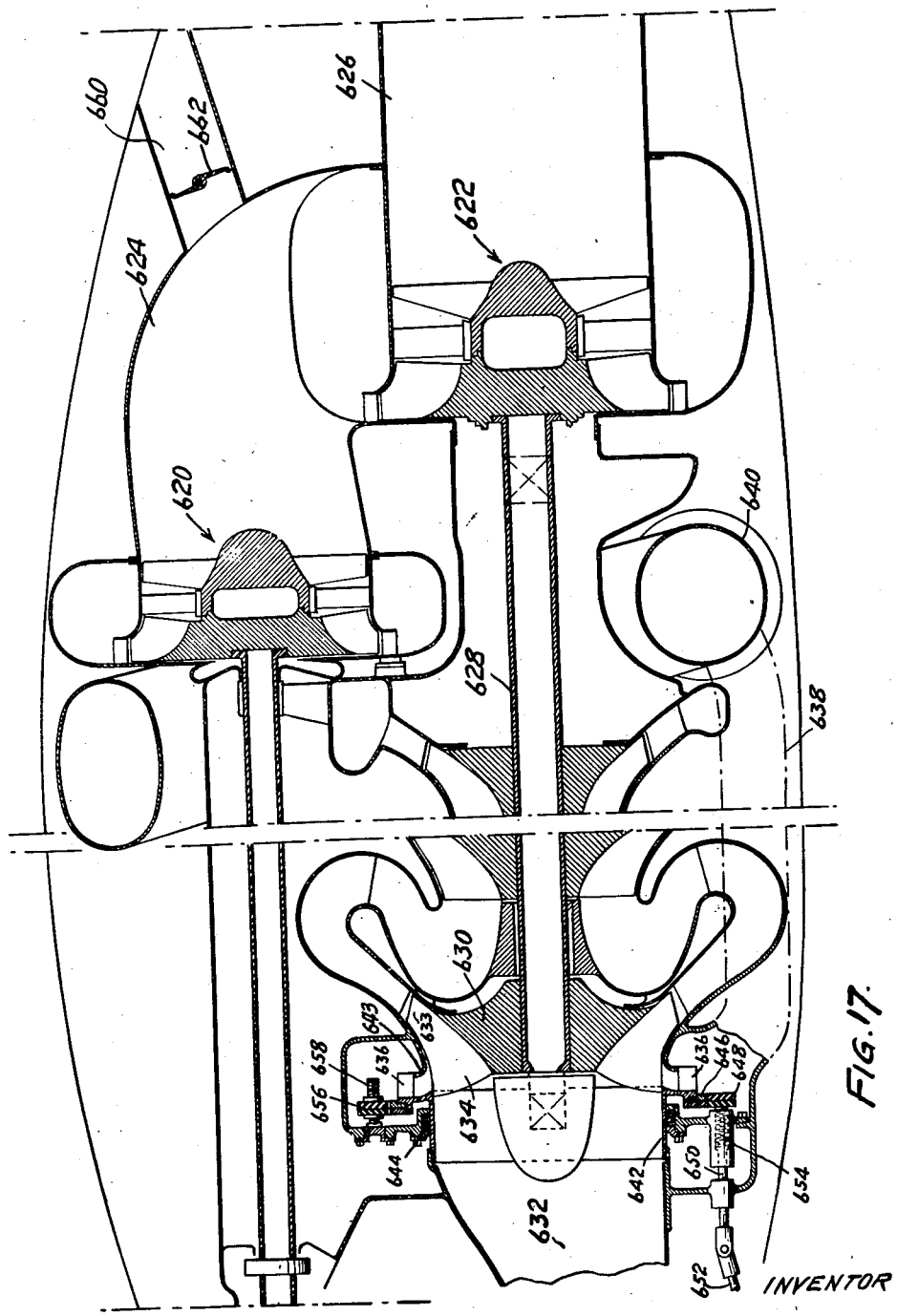
Figure 18:
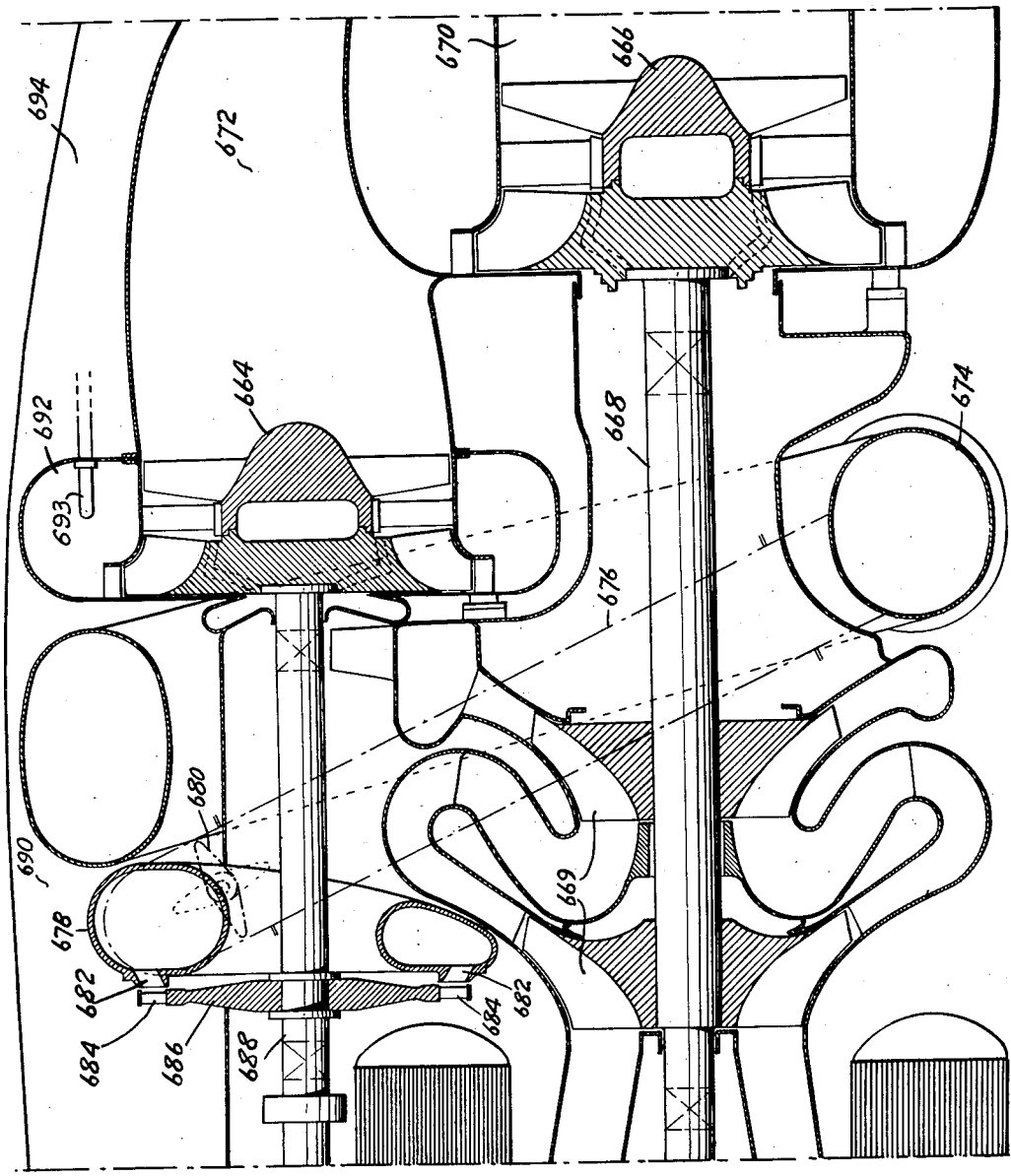

Figures 6 to 9, inclusive, are diagrammatic views, partially in section, and generally similar to Figures 1A and 1B, illustrating various modified embodiments of the invention;

Figures 10 and 11 are, respectively, diagrammatic views, partially sectional in character, illustrating in side elevation and plan another and preferred form of the invention;

Figures 12A, 12B, and 12C are sectional views in order from front to rear of the unit of Figures 10 and 11;

Figure 13 is a vertical section taken on the broken plane 13—13 of Figure 12B;

Figure 14 is a vertical section taken on the broken plane 14—14 of Figure 12C;

Figure 15 is a vertical section taken on the broken plane 15—15 of Figure 12A;

Figure 16 is a horizontal section taken on the plane 16—16 of Figure 15;

Figure 17 is a diagrammatic sectional view showing an alternative regulating arrangement applicable to units of the preceding types; and Figure 18 is a diagrammatic sectional view showing still another regulating arrangement.

An airplane embodying the units is illustrated at 2, the units being indicated at 4 as driving a pair of propellers, shown at 6. The propeller hubs 8 and the housings 10 of the units form continuous streamlined arrangements or nacelles, merging, for example, with wing surfaces or other streamlined parts, the smooth surfaces of which units are desirably interrupted to a minimum degree. Connecting pipes, which will be described later, may desirably be within the surfaces of the airplane wings.

Referring to the first modification and particularly to Figures 1A and 1B, the propeller shaft is driven through reduction gearing 12, located within the housing, from the main turbine shaft 14 mounted in bearings 16 and 18 and carrying the main turbine wheels. The driving gases are supplied through the connection 20 to the gas chest 22, feeding the nozzles 24, which expand and direct the combustion gases at high velocity into the buckets 26 of the first stage turbine wheel 28. From these buckets the gases flow into the passage 30, which serves as a gas chest for the second stage, the gases being directed in this stage by nozzles 32, which expand them to produce a high velocity of flow into the buckets 34 of the second stage wheel 35. From these last named buckets, the gases pass to the exhaust passage 36, and thence through the connection 38 to the auxiliary turbine, illustrated in Figure 1B. From the gas chest 40 of this turbine, the gases are expanded and directed by the nozzles 42 into the buckets 44 of the third stage turbine wheel 52. From this, they pass into the annular chamber 46, from which they are again discharged with a final expansion through nozzles 48 into the buckets 50 of the fourth stage wheel 54.

As will be evident from the drawing, the first and second stages form a main turbine entirely independent of the auxiliary turbine constituted by the third and fourth stages. The latter turbine is carried by the overhanging end of the compressor shaft 56, mounted in bearings 58 and 60, and carrying a number of compressor impellers.

The air to be compressed enters openings 62 directed to receive air from the slip stream of the propeller as it passes over the forward end of the housing. The air entering openings 62 at high velocity passes into a common, annular diffuser region 64 where its velocity energy is transformed into pressure. From this region, it passes through the impeller passages 66 of the first stage impeller 68 whence it is discharged into the diffuser passages 72 in a cross-over arrangement indicated within the portion of the housing at 70. In the diffuser passages velocity is transformed into pressure and the air is fed from the cross-over passage to the impeller passages 74 between the vanes of the next stage impeller 76, from which it is directed into the second stage diffuser 78. From this, the air may pass through the tubes of an intercooler 80, if that is used, and into an annular region 86 from which it is picked up by the vanes 88 of the third compressor impeller 90. This in turn discharges into diffuser passages 92 followed by cross-over passages which redirect the air into the last and final stage-impeller 96 provided with vanes 94. Finally, after passing through diffuser passages 98 of this stage, it is directed from an annular space, indicated at 100, into a receiving header 102, located at one side of the tail passage for the gases from the last turbine stage. From the header 102, the air passes through tubes 106 and 108, the arrangement of which is most clearly indicated at Figure 3, into a receiving header 104 for the gas which is now compressed and heated, the heating being effected by heat exchange from the hot discharge gases of the last turbine stage which flow in the form of high velocity jets through the central and annular passages 110 and 112 provided by the arrangement of the tubes 106 and 108.

From the header 104, the air passes through the duct 114 to the burner illustrated at 116, to which fuel oil is supplied as indicated at 118. Here combustion takes place, and the hot gases under pressure pass through the duct 20 to the first turbine stage, as described above.

The intercooler indicated at 80 may be cooled by scooping in air at 82 over the finned tubes through which the partially compressed air passes. The cooling air thus introduced is redischarged at 84 into the slip stream passing over the housing.

The first stages, at least, of the turbines handling the extremely hot gases may require cooling, and for this purpose there are provided cooling passages in the blades which define the turbine buckets. An air chest 120 is illustrated which may be fed by compressed air led from one of the preliminary compression stages, for example, the second, through a connection indicated by construction lines in Fig. 1A. The cooling air thus provided is picked up by the impeller portions of the cooling passages 122 provided in the hub and bucket vanes, to the form of which passages reference will be made hereafter. The cooling air, heated and expanded, mingles with the discharged gases from the stage which it cools. Similarly, the second stage is cooled, being provided with an air chest 124 supplying the cooling air to the passages 126. The air supply for cooling these stages must be at least at a pressure sufficient to overcome the back pressure existing in the discharge spaces of the respective stages, taking into account fan action at the discharge portions of the cooling passages.

In the case of the third stage, the cooling air may be conveniently taken from the passage 128 fed from the last stage of the compressor, the cooling passages in the blades being indicated at 130. In the event that cooling of the last stage is necessary or desirable, suitable cooling passages 134 may be provided, fed with compressed air from the space 132, to which air may be supplied from the space 100. This matter of convenience, however, must be balanced against the loss of efficiency resulting from using the high pressure cooling air rather than low pressure air from the first, or not later than the second, compressor stage, from which, in fact, the cooling air may be derived. In the low pressure third and fourth turbine stages, the energy put into the high pressure air in the later compressor stages cannot be fully regained, and consequently, if mechanical arrangement permits, the cooling air should be derived from the first compressor stage through suitable connections.

The above gives a general outline of the layout of the unit, the features of which may now be described in greater detail.

The tubine stages desirably follow the design features detailed in my Patent No. 2,283,176, issued May 19, 1942, or may alternatively embody the features of my application Serial No. 422,837, filed December 13, 1941, now Patent No. 2,410,259, issued October 29, 1946. This remark applies fully to the first three stages, and substantially to the last stage, though, as will be pointed out hereafter, that stage is desirably inefficient from the standpoint of blading efficiency in order to secure the best jet efficiency to provide discharging gases flowing rearwardly at a high velocity to aid in the propulsion of the unit. The cooling passages which have been described are desirably arranged in accordance with the principles of said patents, in order to recover as much energy as possible from the cooling air.

The arrangement of the two wheels of the main turbine is highly desirable to secure not only economy of space, since the discharge passages may be conveniently interrelated as indicated in Figure 1A, but also to make it possible to introduce the cooling air to both wheels from one of the compressor stages, for example, the second, since the pressure therein in a unit of the type illustrated will be sufficiently high for the purpose. In the case of the auxiliary turbine, the two wheels are not arranged outlet facing outlet but rather to discharge in the same axial direction, since it is desired to have the discharge from the last wheel pass directly into the tail passage to provide a high velocity jet.

The cooling at 80 between the compressor stages may or may not be desirable, depending entirely on the ultimate requirements of the design. Its object is to reduce the amount of work to be done by the later compression stages to secure a predetermined over-all compression ratio and to maintain the air temperature sufficiently low so that aluminum impeller and magnesium alloy housing parts can be used. However, considering the complete operation of the unit, it will not pay greatly, because it cuts down the final temperature of the air and requires more fuel to raise the temperature of the combustion gases to a point to secure the maximum efficiency of the turbine units. While to a net extent it will generally pay for its presence, its contribution may in some instances be of insufficient value to warrant its incorporation. In such case, it may be omitted, and in the instance illustrated, the air from the second stage may pass directly to the third.

The heat transfer from the discharging gases to the compressed air prior to the burning of the fuel is highly desirable. The jet effect of the discharge gases from the standpoint of their production of a useful thrust is not reduced by such heat transfer to a greater extent than the efficiency is increased by the heating of the compressed air. In fact, a maximum exchange of heat is desirable at this point consistent with the maintenance of a high jet velocity which might be substantially interfered with if a heat exchanger of very high heat transfer efficiency were provided. An arrangement of the type disclosed is considered most desirable in which a minimum of mechanical interference with the jet flow exists while a sufficiently effective transfer of heat is secured through the walls of the coils. The passage of the compressed air over the low pressure turbine casing serves further to heat the air while at the same time cooling this turbine.

As indicated in Figure 1B, the last stage of the auxiliary turbine is provided with buckets approaching an axial flow construction. The vanes defining these buckets may be designed, with the desired ends in view, in accordance with the disclosures of my prior Patents No. 1,926,225, dated September 12, 1933, and No. 1,959,703, dated May 22, 1934, and my Patent No. 2,283,176 dated May 19, 1942, mentioned above. The operation of this last stage may be best made clear by considering the conditions illustrated in Figure 4, which is a vector diagram of conventional type illustrating the flow characteristics of this stage during its operation under rated conditions and holding approximately for substantial variations therefrom. The jet velocity of the driving gases of this stage is indicated at $c_1$. The average peripheral velocity at the entrance of the buckets is shown at $u_1$, and $w_1$ is the relative velocity at the entrance. The peripheral component of the jet velocity is shown at $c_{u1}$.

The average relative discharge velocity is shown at $w_2$, which, together with the average discharge peripheral velocity indicated at $u_2$, gives the absolute discharge velocity $c_2$. The peripheral component of this last velocity is $c_{u2}$ and the axial component is $c_{a2}$.

This diagram shows that the dynamic efficiency of this last stage is quite low, i. e., it contributes rather little to the drive of the shaft 53. However, the approximate axial direction of the absolute discharge velocity, giving rise to a very large axial component $c_{a2}$, indicates the purpose of this last stage, i. e., to secure a maximum jet velocity to give rise to a driving thrust on the unit.

The desired flow characteristics may be achieved readily by proper choice of angles entering into the turbine blading design as described in said prior patents.

While final expansion and a high velocity jet might be achieved by nozzle expansion from the preceding stage discharge, it is highly desirable to recover substantial mechanical energy through the utilization of a final turbine stage of the type described. The first stage of the low pressure turbine is desirably designed for high efficiency.

There have not been described above the various interconnections and control arrangements comprising primarily butterfly valves and pipe connections. These will be best made clear from consideration of the diagram of Figure 5, which is in the nature of a flow diagram for the air, fuel and gases, and illustrates one regulating system, others offering special advantages being described hereafter.

The high pressure turbine unit is indicated, as a whole, at 150, connected to a propeller 6. The multistage compressor is shown at 152, the low pressure turbine at 154, the heat exchanger at 156 and the main burner at 158. Fuel enters the main burner through a valve controlled passage 160, and the products of combustion pass through the connection 162 (physically the pipe 20) to the first stage of the high pressure turbine. A control valve 164 is provided in this passage, and in advance of it a by-pass 166 controlled by a valve 168 connects the passage 162 to the conduit 170 arranged to deliver the discharged gases from the high pressure turbine to the low pressure turbine. The gases from the latter, after passing through the heat exchanger arrangement provide the propulsion jet 172. Compressed air passes from the compressor through the connection 174 to the heat exchanger, whence it flows through 178 to the burner. The connection 174 is desirably provided with a valved outlet 176 from which compressed air may be taken. A valved outlet 180 in the connection 178 permits the taking off of heated compressed air for heating a cabin or other purposes.

In the event that it is desired to add heat between the high pressure and low pressure turbines, a burner 186 may be introduced in the connection 170.

The various connections illustrated in Figure 5 enable an operator to secure proper starting, idling and running conditions.

By control of the amount of fuel fed to the burner, the proper speed of drive of the low pressure turbine for idling may be obtained. To bring the high pressure turbine into operation and at any desired speed, the valves 164 and 168 are simultaneously manipulated, 164 being opened as 168 is closed while the feed of fuel is regulated. To bring the high pressure turbine up to full power, 164 may be opened fully and 168 closed with a maximum introduction of fuel. By the proper control of the introduction of fuel which controls the working gas temperature, it will be evident that the high pressure turbine may be driven at any desired rate and that the low pressure turbine driving the compressor may be controlled to suit the air requirements of the burner for proper operation. The low pressure turbine may be automatically governed so that its operation will correspond to the demand placed upon it, though this is in great part automatically the result of its operating as one or more stages subsequent to the main turbine.

While, in general, the discharge gases from the high pressure turbine will retain sufficient energy to drive the auxiliary low pressure turbine to take care of its compressor load, if the heating of a large airplane and the maintenance of supercharged condition in its cabin is also one of the burdens of the low pressure turbine, auxiliary heat may be introduced into the gases driving the low pressure turbine through the presence of an auxiliary burner 186 interposed in the connection 170. The desirability or necessity for the presence of this burner depends on the load which must be carried by the auxiliary turbine.

The description thus far outlines the basic principles of the invention which, in their broader aspects, involve the use of a high pressure turbine developing the entire useful brake horsepower output located forward and driving a propeller through suitable reduction gearing, and the use of a low pressure turbine mechanically independent of the high pressure turbine and capable of independent control to drive a compressor at whatever speed is necessary to suit the prevailing load and altitude requirements. In attempting to carry these basic principles into practice, however, it is found that various embodiments of the invention have disadvantages, and it seems difficult, if not impossible, to provide an embodiment of the invention which is without any disadvantages. Accordingly, there will now be described various additional modifications, each overcoming one or more of the drawbacks of the modification heretofore described, which modification, however, has its own distinct advantages. In order to bring out the features of the additional modifications more clearly, there will first be discussed various disadvantages which may occur in the several designs and which it is the common object of all of them to cure to the extent to which this is consistently possible.

In aircraft design, and particularly in the design of high speed planes, bulk and weight of the driving unit must be kept at a minimum. Crossover piping between high pressure and low pressure turbines and the piping which may be embodied in the combustion chamber and which connects the discharge header of a heat exchanger with the high pressure turbine represents an objectionably large percentage of the whole bulk and weight of the unit. Furthermore, this piping must be located outside the actual power plant nacelle, and even though it is located within the wings of the airplane, it greatly increases the frontal area of the power plant.

Friction in long connecting passages, and particularly in their sharp right angular turns, represents a major loss in the efficiency of the unit and should be kept to a minimum.

It is of great importance for maximum efficiency that the passage provided for the combustion air between the point where it is taken on board an airplane and the inlet to the first stage compressor impeller should be as smooth and free from turns as possible and the air intake so arranged as to get the maximum possible advantage of the ram effect, i. e., the effect of relative motion of the airplane and air.

If a multiple stage low pressure turbine is provided, it should not involve too great an overhang of a low pressure turbine shaft for reliable performance in an airplane intended for great maneuverability and wherein high acceleration forces must be taken into account.

If a large number of stages of compression are involved, as in the four stage compressor illustrated in Figures 1 and 1A, the unsupported length of the compressor shaft must not be too great if it is desired to hold the shaft deflection within a reasonable maximum under extreme conditions of airplane acceleration.

If a large number of compressor stages, such as four, are on the same shaft, the speed of the first and last stage must obviously be the same. This means that the most suitable speed for the first stage is much too low for the last stage, or that the most suitable speed for the last stage is far too high for the first stage.

If the high pressure and low pressure turbines with their hot casings are separated by the compressor, the casing of which should be kept as cool as possible, there is a very difficult installation problem involved.

It will be evident that all of these disadvantages are to a greater or less degree present in the modification heretofore described, which, however, has certain advantages particularly in compactness. The modifications now to be described involve the avoidance of some of these disadvantages, and the choice of the particular modification to be used depends largely upon which disadvantages it becomes most important to remove in view of the nature of the airplane or other vehicle in which the power plant is to be incorporated; for example, in a transport plane, features which enable the mechanism to stand up under high acceleration forces are of little importance, though these become of major importance in the case of a fighting plane or dive bomber.

Referring first to the modification of Figure 6, there is diagrammatically indicated at 192 in the forward portion of the nacelle of the unit the bearing and reduction gearing assembly through which the high pressure main turbine wheel 190 drives the propeller 194. Combustion gases are delivered from the gas chest 248 through the nozzles 196 to the buckets in this turbine wheel. The gases discharged therefrom pass by way of the connecting pipes 198 to the gas chest 200 of the first stage of the auxiliary turbine. They are further expanded through the nozzles 202, whereby they are discharged into the buckets 204 of the wheel 205. The discharged gases then flow by way of the crossover passage 206 through the nozzles 208, wherein they are again expanded and pass through the gas passages 210. These passages form a third stage, and the vanes 211 defining them are carried by the same rotor 205 which is provided with the passages 204. The design of the two stages of this auxiliary turbine may be the same from the standpoint of energy transformation as previously described in connection with the first modification, the gases being discharged at high velocity through the tail passage 212, the expansion being as before substantially to the atmospheric pressure existing at the outlet of the tail passage, no further substantial expansion occurring therein. The air to be compressed enters the nacelle through side openings which may communicate with slots in the adjacent wing surfaces, (as more fully described hereafter; see Fig. 11) and is directed, with as little deflection as possible to take advantage of the ram effect, into the intake passage 214 from which the air is scooped by the impeller vanes 216 of the first compressor stage. The air then flows in succession through the diffuser and cross-over passage 220, the second stage impeller 222, diffuser passages 224, cooler 226, passage 228, impeller 232, diffuser and cross-over passages 234, impeller 236 and diffuser 238 into headers 240 and discharges about the tail passage 212 through the annular space 241 at the end of the headers 240. All four impeller stages are carried by the shaft 218 of the turbine 205. Cooling air flows as indicated at 230 from the intake passages in heat exchange relationship with the compressed air in the cooler 226 and thence may be discharged through slots in the outer surface of the nacelle.

The compressed air headers 240 may form essentially duplicates of the compressed air header 102 of the modification previously described, which are connected with receiving chambers 242 into which there extend the duplicate burner assemblies 244, arranged for the introduction and burning of the fuel. The products of combustion then pass by way of pipes 246 to the gas chest 248.

It will be noted that the pipes 198 surround the pipes 246. This not only results in a more compact arrangement, but heat exchange occurs so that the gases reaching the low pressure turbine wheel are reheated following their discharge from the high pressure wheel. A further important advantage of this arrangement is that the pressure differences across the walls of the combustion chambers are reduced, making possible a simpler and better design.

In this modification, by the use of a single high pressure wheel an overhung arrangement may be provided as illustrated, eliminating the outboard bearing and stuffing box of the arrangement previously described. A single stage high pressure wheel, however, is practical only for low altitude designs and relatively low compression ratios, and is permissible only when lower thermal efficiencies may be tolerated.

The two stages of the low pressure turbine are arranged back to back as illustrated, whereby the overhang of the low pressure rotor is substantially reduced.

The arrangement of the intercooler is also advantageous and compact, simplifying structural arrangement and making it possible to effect some shortening of the impeller shaft.

For simplicity, the turbine wheel cooling arrangements are not illustrated in this and subsequent modifications, these being of the type previously described in connection with the first modification.

In the modification of Figure 7, the high pressure turbine wheel 250 is again overhung from its bearing 252 and drives through suitable reduction gearing the propeller of the plane. The gas chest 254 serves for the delivery of driving gases through the expanding nozzles 256 into the buckets 258 of the high pressure wheel. The gases discharged from the buckets 258 pass directly through the buckets 260 of an intermediate pressure wheel mounted on the shaft 262. To this end, the two wheels are arranged in a common casing and rotated in opposite directions. The buckets of the high pressure wheel are so designed as to discharge the gases with a peripheral component of velocity proper for the gases to enter the intermediate pressure turbine passages without any intervening stationary elements or nozzles, resulting in a substantial increase in turbine efficiency. It will be noted that the intermediate stage wheel has passages which involve flow in a direction only slightly toward the axis, this wheel being of a semi-axial flow type.

The gases discharged from the intermediate stage wheel pass by way of the discharge passage 264 and a connecting pipe to the gas chest 266 of the low pressure third stage turbine, from which they are discharged through nozzles 268 through the turbine passage 270 of the wheel 272 carried by the shaft 273. The discharged gases pass through the tail passage 274 after expansion in the wheel to the atmospheric pressure existing thereat to provide a high velocity jet. In this case, heat exchange between the compressed air and the discharged gases does not take place.

The low pressure wheel 272 operates at a considerably lower speed than the intermediate pressure wheel 260, the two shafts 273 and 262 being independent. For example in a unit delivering 3500 horsepower, shaft 273 may operate at 8250 R. P. M. while shaft 262 may operate at 11,300 R. P. M. The shaft 273 carries first and second stage impellers 278 and 286. The first stage impeller receives the air from the entrance region 276, which communicates with wing slots as previously described (see Fig. 11). It is delivered by the impeller passages 280 to the diffuser crossover passages 282 and thence to the passages 284 of the second stage impeller, by which it is delivered through the diffuser passages 288 to a cooler 290 of the type described in connection with Figure 6. From this cooler the air then passes by passage 292 to the third stage impeller 306, carried by the shaft 262 from which it flows to the last or fourth stage impeller 308, also carried by shaft 262. The compressed air is then delivered through the diffuser passages 310 to the pipe 312 surrounding the combustion chamber 318 and communicating therewith in the region 314 surrounding the burner 316, so that the air is heated by interchange with the combustion chamber prior to reaching the burner and prevents heat losses to surrounding parts such as would result if the combustion chamber was not so surrounded by the air passage. The products of combustion are delivered by the combustion chamber pipe 318 to the gas chest 254.

While the connecting pipe 264, the air passage 312, and the combustion chamber 318 are illustrated singly, each of them is desirably duplicated. The combination air pipe 312 and combustion chamber 318 may be extended laterally from the unit within the adjacent portions of a wing.

The cooling air, after passing through the cooler 290, may flow as indicated at 302 through a region surrounding the first stages of the compressor within the outer wall of the nacelle, thereby providing an insulation of the impeller stages against the heat of the combustion chamber if that extends rearwardly, as indicated, along the nacelle. This air finally passes as indicated at 298 about the gas chest 266 of the low pressure stage and then flows rearwardly through a passage 298 about the tail passage 274 and discharges about the jet from that passage through the annular space 275 at the end of passage 298. The air thus forms an additional jet aiding the action of the main jet of exhaust gases.

In order to maintain the compressor shafts and their bearings cool and to minimize transfer of heat from the turbine rotors, the shafts 262 and 273 are made hollow and are arranged to receive compressed air from a chamber 294, communicating with the air passage 292 intermediate the second and third compressor stages. The air thus flowing through the shafts is discharged through openings in the shafts at 296 and 300. These openings at the high speed of operation serve to act as impeller passages, producing a substantial amount of flow. The discharged air from these regions joins the air from the cooler 290, passing ultimately into the tail passage 298.

This modification has various advantages, of which several have already been pointed out. The provision of independent turbines for driving the earlier and later stages of the compressor provides a proper distribution of speeds, so that the first compressor stages may be operated at lower speed than the later stages. It will be noted that both turbines may be overhung on the ends of the compressor shafts.

The ram effect whereby compression is secured due to the relative velocity of the power plant and the atmosphere can be considered as constituting a first compressor stage if full use is properly made of this effect. In the preceding modifications, this effect is utilized to some extent, but the most efficient use thereof requires direct inlet of the air to the suction stage of the impeller. This is provided for in the modification of Figure 8.

In this modification, the high pressure turbine drives, through the shaft 322 and reduction gearing enclosed in the housing 324, the propeller 326. The exhaust gases therefrom are delivered through the tube 328 to the gas chest 330 of the second turbine stage, being discharged through nozzles 332 into the bucket passages 336 formed in the rotor 334, which also carries the vanes 342 constituting a third turbine stage. The gases exhausted from the buckets 336 pass by way of connections 338 to nozzles 340, from which they are discharged between the vanes 342 and at atmospheric pressure and high velocity through the tail passage 344 in the form of a jet providing substantial reaction.

The wheel 334, it will be noted, has its axis displaced to one side of the axis of the high pressure turbine 320 and its shaft extends parallel to the axis of the propeller within an auxiliary nacelle 346, provided with an opening 348, preferably in line with the flow from the propeller 326. The shaft 335 of the wheel 334 carries four impellers, indicated at 354, 360, 371 and 376. As in the case of the previous modifications, the flow paths are through the passages 352 of the first compressor stage, the diffuser and cross-over passage 356, impeller passages 358 of the second stage, its diffuser, a cooler 362, the passages 370 of the third stage, diffuser and cross-over passages 372 and passages 374 of the last stage and its diffuser 375. The air so compressed is led about the transfer passages between the intermediate and final turbine stages into the header 378, from which it flows into the receiving header 380, where it serves to burn the fuel entering through the burner 382, the products of combustion being delivered to the gas chest 384, from which they flow through the nozzles 386 into the high pressure turbine stage.

It will be evident that this modification leads to the attainment of a very high ram efficiency. Additionally, the separation of the center lines of the turbines results in improved flow passages between the high pressure turbine and the low pressure turbine, and in a particularly desirable arrangement of the combustion chamber. While the frontal area of the entire unit is increased, this increase is relatively small since the frontal areas of the combustion chambers have had to be included in the previous designs.

In the modification of Figure 9, the direct flow of gas from the high pressure to the intermediate pressure turbine, with opposed rotations thereof, is secured together with a compact arrangement of the combustion chamber and high pressure air duct. There is also secured the advantage of operating the high pressure part of the compressor at a higher speed than the low pressure part. The high pressure combustion gas chest is indicated at 388 and is arranged to discharge its gases through the nozzles 390 into the buckets 392 of the high pressure turbine stage 394, which serves to drive the propeller 452 through reduction gearing in the housing 450. The gases discharged from the buckets 392 pass, as in the modification of Figure 7, directly through the passages 398 of the intermediate pressure turbine wheel 396, which rotates in a direction opposite the direction of rotation of the wheel 394, the buckets and passages being so designed that proper entry of gas is effected into the passages 398 without intermediate nozzles. The discharge from the passages 398 enters the annular region 400, from which it passes, by way of a pair of pipes 402, to the gas chest 404 of the low pressure turbine stage. From this it is delivered through nozzles 406 to the passages 408 of the rotor 410, from which it is discharged as a high velocity jet through the tail passage 412. The turbine wheel 410 is mounted on a shaft 414, independent of the shaft 416, which carries the turbine wheel 396.

The air, which enters through wing slots or the like, is carried to a zone 418 from which it may enter the impeller passages 422 of the first stage impeller 420. Thence the air passes, as in the previous modifications, through the diffuser and transfer passages 424, passages 426 of impeller 428, its diffuser 427, the cooler 430, entrance passage 432 to the third stage impeller 438, the passages 436 of the latter, the diffuser and transfer passages 440, and the passages 442 of the final compressor stage 443, from the last of which it is discharged through the diffuser passages 444 into a receiving chamber 446, from which it is delivered directly to the chest 448 about the burner tubes 454 and 456. The air is directed into these tubes through deflector members indicated at 458 and there meets the fuel introduced through burners 450. The products of combustion then pass by way of the spiral tubes which surround the bearing 460 to the gas chest 388 of the high pressure turbine stage.

For the purpose of cooling the intermediate and low pressure rotors, air is bled from the chamber 432 into the space 434 between the open ends of the shafts, being discharged, as previously described, through openings 435 adjacent the rotors. This air thereafter passes to the region about the tail passage 412, as indicated by the arrows and discharges through the annular opening 413 at the end of the space surrounding the tail passage 412.

In this modification, it will be evident that the combustion chambers arranged in a helix around the high pressure turbine and the after portion of the gear reduction are of a very compact type. Being housed within the high pressure air chamber, they are relieved of great pressure differences and are effectively insulated from the surrounding parts by a layer of flowing air. The helical combustion chamber arrangement reduces the frontal area of the unit and leaves nothing but the cross-over pipes between the intermediate pressure and low pressure turbines protruding outside the power plant nacelle.

In Figures 10 to 16, inclusive, there is illustrated a further modification which, in general, offers the best compromise of advantageous features for the majority of applications. For this reason, it will be described in greater detail than the other modifications, it being understood that various advantageous features thereof may also be applied to the modifications heretofore described. The particular advantages of this arrangement will be indicated following a detailed description thereof.

In this modification, provision is made to drive twin propellers 470 and 472 in opposite directions, and to secure this result, the propellers are respectively mounted on hub members secured to shafts 466 and 468, both of which are desirably hollow, with the shaft 468 surrounding the shaft 466. Shaft 466 carries the gear 474, while shaft 468 carries a gear 476 of the same diameter.

The drive of these gears is illustrated in Figures 15 and 16, taken in conjunction with Figure 12A. The gear 474 is driven by a pinion 478 on the shaft of which is a gear 480, meshing with a driving pinion 482.

Gear 476 meshes with an idler 484 which is driven by a pinion 486 of the same diameter as the pinion 478. On the shaft of 486 is a gear 488 of the same diameter as gear 480, and this gear 488 is driven by the pinion 482. It will be evident from this arrangement that the two gears 474 and 476 and their respective propellers will be driven at the same speed in opposite directions. The various gears and pinions are desirably constructed in accordance with turbine reduction gear practice. In order to secure a minimum of weight and inertia, these gears and their shafts are of hollow or webbed form, as illustrated in the figures.

The pinion 482 is coupled through a semi-flexible connection 490 to a shaft 492, which in turn is semi-flexibly coupled, as indicated at 494, Figure 12C, with the shaft 496 secured by a nut 504 to a threaded portion of one part of a multiple part hub 502 of the high pressure turbine. For ease of manufacture, this hub is made up of several parts secured together by bolts (not illustrated). The turbine which comprises the hub 502 has two stages, the first of which is defined by the bucket passages 506, receiving driving gases from the nozzles 508 and discharging the gases through the redirecting passages between stationary vanes 510, which cause the gases to flow properly to the second stage turbine passages indicated at 512, which are desirably of semi-axial flow character of the type described above. The discharged gases pass into the receiver region 514, from which they flow to the second turbine stage through the connection 527, as will be described hereafter. In order to effect proper cooling of the high pressure turbine, the hub thereof is provided with cooling air passages indicated at 516, which communicate with grooves 498 provided on the outer surface of the shaft 496 interiorly of the bearing within the housing 500. The construction here involved is disclosed in greater detail in my application Serial No. 408,787, filed August 29, 1941, now Patent No. 2,403,489, issued July 9, 1946. Briefly stated, it may be said that the passages 516 have entrance portions acting as impellers which cause cooling air to flow from the region about the shaft 496 through the grooves 498 into the passages 516. Within these passages the air is heated and is then discharged rearwardly with a radial inward component with recovery of some of the energy which the cooling gas has by reason of the pressure resulting from the impeller action and the addition of heat from the hub. The discharged air, which is still relatively cool as compared with the driving gases, is desirably redirected through passages 518, which are kept separate from the redirecting passages for the driving gases by an annular shield 519. From the passages 518 the cooling air is discharged through the inner portions of the passages 512, flowing over the hub 502 to secure still further cooling of the hub. The air then mingles with the gases in the region 514.

Additionally, cooling air may be applied to the turbine from the region 520, communicating with the atmosphere. The air from 520 passes through the impeller portions 522 of cooling air passages into portions 524 thereof, whence it may be discharged into the discharge portions of the buckets 506. The construction for accomplishing this result is desirably of the type illustrated in said Patent No. 2,410,259. The cooling and recovering of power in both the passage systems described is in accordance with the disclosure of my Patent No. 2,283,176, referred to above.

The gases discharged from the high pressure turbine into the region 514 flow to the gas chest 528 by way of the connection 527 (see Figure 14). From the gas chest 528, the gas flows through nozzles 530 to the low pressure turbine, which also involves two stages. In this case, a multiple part hub 534 carries blading defining third stage buckets 532, which receive the gases directly from the nozzles 530, as well as fourth stage buckets 538, primarily of axial flow type, between which sets of buckets the gases are redirected by stationary vanes 536. Cooling air for the low pressure turbine flows, as in the case of the high pressure turbine, through grooves 542 in the shaft 543 thereof, these grooves also extending inside the bearing within the housing 540, which may be of the type described in said Patent No. 2,403,489. The cooling air approaches the hub through passages 544, and enters the cooling gas passages 546, being then redirected by the passages 548 separated from the driving gas passages and redirected across the surface of the discharge portion of the hub through the inner portions of the fourth stage buckets. The construction and cooling arrangements, it will be recognized, are essentially similar to those provided in the case of the high pressure stage turbine, with the exception, however, that it is generally unnecessary to provide the additional cooling resulting from flow through such passages as 522 and 524 of the high pressure turbine. As in the case of the previous modifications, the low pressure turbine is so designed as to discharge its mixture of gases and cooling air into and through the tail passages 550 as a hight velocity jet contributing to the propulsive action.

The shaft 543 is connected on the forward side of the bearing 540 with the rearmost shaft portion 552 of a four-stage centrifugal compressor particularly shown in Figure 12B. It has been found advantageous to provide such compressor by an assembly of hub portions without necessarily providing a continuous shaft extending through all of them. The particular arrangement of these hub portions is not claimed herein but forms the subject-matter of my application Serial No. 443,957, filed May 21, 1942, now Patent No. 2,405,284, issued August 6, 1946, it being understood that the portions are secured together by bolting or any other fashion with associated shaft sections, so that in general the compressor assembly is hollow along its axis. Bearings 554 and 556 support the compressor. These bearings are also desirably of the type illustrated in said Patent No. 2,403,489, though the cooling features may be omitted.

The first stage of the compressor receives its air from the chamber 558. The first stage impeller is indicated at 560 and delivers the air from chamber 558 to the diffuser and cross-over passage indicated at 562. This passage desirably has the construction more specifically described in my application Serial No. 442,264, filed May 8, 1942, now Patent No. 2,419,669, issued April 29, 1947, to secure at the high velocities involved a proper diffusing action and deliver, without substantial spin, the air to the second stage impeller. To provide guidance at the high velocities involved, annular streamlined deflectors 564 are provided adjacent the discharge ends of these passages.

The second stage impeller 566 delivers air through the diffuser 568 to the passage 569, whence the air flows forwardly through one set of tubes 570 of an intercooler shown in front elevation in Figure 13. The air enters the header 572 and then flows rearwardly through a second set of tubes 574 into the passage 576, from which it enters, with suitable guidance involving the streamlined deflectors 578 the entrance of the third stage impeller 580. The impeller delivers the air through the diffuser and cross-over passage 582 provided with guides 584 and of essentially the same construction as the diffuser between the first and second stages. The fourth stage impeller 586, receiving the air therefrom, delivers it through the diffuser 588 into the passage 590. The passage 590 is spiral in form and smoothly continuous with the conduit 592, which merges with the combustion chamber 598, in turn smoothly opening into the gas chest 526 of the high pressure turbine. The arrangement of these passages will be evident from consideration of Figure 14 in conjunction with Figure 12C. A jacketed burner 596 is provided in the lower portion of the combustion chamber 598, and is supplied with fuel through the connection 597. Guide vanes 594 immediately in advance of the burner 596 direct flow of air properly through and about the burner, the latter action serving to provide a relatively cool zone about the region of combustion to protect the walls of the combustion chamber from the extremely high temperature of the flame.

In order to take advantage of the ram effect and secure thereby an initial compression, the chamber 558 and also the housing 600 surrounding the intercooler tubes 570 and 574 receive air through passages 608, communicating with slots 610 in the wings 612 adjacent the power plant. These slots are preferably arranged at least partially in the slip stream of the propellers so that a high velocity of entrance air into the slots is secured. In the case of the impeller, the ram effect provides an initial compression, while in the case of the intercooler a pressure drop providing air flow is provided across the compressed air tubes, the cooling air leaving this system at 602.

The forward end of the compressor drives through suitable reduction gearing the lubricating oil pump 604 which is merely diagrammatically illustrated. This, through a suitable connection supplies oil under pressure to the gearing of Figure 12A. Drain pipe 606 serves to return oil from the gearing.

Figure 10 illustrates diagrammatically the enclosure of the entire power plant within a nacelle 617. As indicated therein, the tail passage 550 terminates in an opening at 614 adjacent the rearmost portion of this nacelle. From this opening there issues the high velocity propulsion jet described above. In addition, between this tail passage 550 and the walls of the nacelle, there exists a passage 618 from which there flows any air entering the nacelle and provided for cooling purposes, particularly the air leaving the opening 602 from the intercooler. This air, it will be observed, flows over the hot portions of the apparatus, for example, the combustion chamber, the gas chests and their connections, to provide insulation of the nacelle and any exterior parts from the high temperatures.

The arrangement in this modification not only eliminates the long cross-over pipes between the turbines, but results in smooth and efficient flow from the combustion chamber into the high pressure turbine. Owing to the location of the gearing in relation to the compressor inlet, full advantage may be taken of the ram effect to provide preliminary compression. The arrangement of the parts is otherwise very compact and in particular adequate cooling of bearings is provided, it being noted that air supplied under suitable pressure may enter readily various openings in the casing walls for flow to the bearings and cooling passages of the turbines. While the high pressure and low pressure compressor stages in this arrangement must be operated at the same speed, and accordingly this design does not avoid the objection to doing this, it affords an excellent solution to most of the other problems involved, and its advantages far outweigh the disadvantages of the same speed of operation of all the compressor stages.

It will be understood that in connection with all of the modifications, controls are provided which may be of the type generally described heretofore and illustrated in Figure 5. However, special regulation arrangements may be used to secure higher efficiencies, and these will now be described.

Regulation or control must involve not only consideration of power to be developed but in aircraft applications the altitude at which the power must be developed, since the operation involves the handling of air originating at widely varying pressures and temperatures. The simplest method of control involves the control of the temperature of the gases flowing to the turbines by control of the rate of fuel injection and this has been assumed as the method of control generally involved in Figure 5 and the description thereof. If the design is made for high altitude operation, this method of control results in poor efficiencies at part load or low altitudes.

Still another alternative is to bypass compressed unheated air directly to the exhaust jet at part loads, since the compressor flow for good compressor efficiency far exceeds the proper flow through the turbines. The resulting velocity of the jet then becomes too high so that its efficiency is very low, so that, although the loss is applied only to a small part of the total flow, the efficiencies are still not as high as desirable.

While the above methods are all usable, two alternatives give much improved efficiencies and will be described.

Referring first to the arrangement illustrated in Figure 17, that figure in diagrammatic form shows a power plant essentially similar to that last described, although it will be evident that the regulating arrangement shown therein is applicable to any of the other modifications. The high pressure turbine driving the propeller is indicated at 620. Its exhaust gases flow to the low pressure turbine 622 driving the multistage compressor through the passage 624, the gases from this low pressure turbine being discharged through the tail passage 626 to provide a jet. The first stage of the compressor 630 carried by the shaft 628 of the low pressure turbine has its impeller vanes 633 extended, as indicated at 634, to provide turbine buckets arranged to receive from nozzles 636 compressed air bypassed through connection 638 from the compressed air passage 640 in advance of the burner. The nozzles 636 are carried by a ring 642 arranged for both sliding and rotary movement within packing 644. The blades defining the nozzles slide on the outside of an annular portion 643 of the outer fixed boundary wall of the impeller passages. The ring 642 is provided with a herringbone gear 646 with which meshes a herringbone pinion 648 carried by a screw 650 connected through shafting 652 to a control wheel or the like. The screw 650 passes through a fixed nut 654. Additional herringbone pinions 655 mesh with the gear 646 and are internally threaded upon fixed screws 658 having the same pitch as the screw 650. From the arrangement described, it will be evident that turning of the screw 650 results in rotation and axial movement of the carrying ring 642, the pinion 648 being locked axially with respect to the gear 646 by reason of the herringbone teeth on both these elements, and the pinion 656 also being axially locked with the gear 646 for the same reason. The axial movement of the ring 642 carries the nozzle blades axially with resulting adjustment of the areas of the nozzles whereby the amount of air directed to the turbine portions of the impeller vanes may be regulated. These vanes and nozzles are so arranged that the air thus entering tends to drive the impeller in the direction of its rotation. Despite the fact that the temperature of the air entering the nozzles 636 is higher than that of the air handled by the first stage impeller, expansion in the nozzles tends to bring the temperature approximately to that of the air flowing through the impeller passages in view of the presence of the intercooler between the compressor stages as in previously described modifications. In this fashion, the net amount of air handled by the impeller is reduced and the compression applied to the air, which may be considered recirculated in the system, is efficiently utilized, by returning a considerable amount of power to the shaft. Thus this arrangement results in good thermal efficiencies at low altitude and part load. While some losses are involved, they apply to only a small part of the flow. The arrangement is quite simple and involves no substantial increase in weight of the unit.

With this arrangement it is necessary to provide a bypass around the low pressure turbine from the region 624 between the turbines. For this purpose the outlet passage 660 is provided controlled by a valve 662. This bypass is provided for operation at maximum power at altitudes above those for which the unit is normally designed. Without the bypass the system would be unstable, since the compressor bypass 638 would be closed under a maximum power condition. Without this bypass, therefore, a runaway condition might result if, as intended with this arrangement, the combustion gas temperature is thermostatically controlled.

From a standpoint of efficiency, the modification illustrated in Figure 18 is still better but has the disadvantage of adding considerable weight which may be prohibitive in aircraft uses. In this modification the power plant is also basically substantially the one last described, the high pressure turbine being indicated at 664 and the low pressure turbine at 666, the latter arranged to discharge through the tail passages 670 to provide a high velocity jet, and receiving its driving gas through the passage 672 from turbine 664. In this modification, compressed air is also bypassed from the compressed air passage 674 in advance of the burner to which passage the compressed air is delivered from the compressor 669 on the low pressure turbine shaft 668. In this case, the by-passed air flows through the connection 676, controlled by the butterfly valve 680, to the air chest 678 from which the air is delivered through nozzles 682 to the buckets 684 of the turbine wheel 686 carried by the shaft 688 of the high pressure turbine. The reason for the provision of the turbine wheel 686 is that if an attempt were made to bypass the compressed air directly to the jet the velocities would be too high to provide for efficient propulsion. By causing the air to expend a considerable proportion of its energy in driving the wheel 686, so aiding the driving of the propellers by the high pressure turbine 664, its residual energy is moderate and proper to be added to the jet for propulsion purposes. The valve 680 may be subject to manual control and may serve as the sole controlling means for the system if thermostatic control of the combustion gases is used as, for example, by control of a fuel pump by a thermostat 693 present in the gas chest 692. It will be evident that bypassing an increased amount of the compressed air would result in a tendency toward a temperature rise in the combustion chamber which would automatically cut down the injection of fuel.

In the above description reference has been made to the use of the jet of exhaust gases for effecting propulsion work. In order that a reaction jet of the type described may be efficient for propulsion purposes, its velocity should not differ greatly from the speed of flight. In other words, for a given amount of energy in combustion gases which may be distributed between the driving of turbine mechanism and the propulsion jet, that distribution is best which, all matters being considered, results in the production of a propulsion jet, the velocity of which is not too high when its temperature is as low as possible. The propulsion jet to be considered, of course, is that made up not only of the discharge from the low pressure turbine but by the combination of this discharge with the cooling air for the system, and bypassed gases, and the like. In general, highly efficient systems may be provided, as indicated above, by mingling all the discharge gases and so operating the systems that the ultimate jet velocity exceeds only to a small degree the velocity of flight, the leaving gases being at the minimum temperature obtainable.

Reference has also been made to the effect of utilization of the ram effect to provide an initial compression at the entrance to the first stage of the compressor. Desirably the air intakes utilize as far as possible the energy otherwise lost in the stream of air flowing directly from the propeller (its slip stream), while the passages should be so arranged by way of expanding shape as to act as diffusers to transform as much kinetic energy as possible into pressure energy, this latter requirement imposing the condition that smooth flow with avoidance of any sharp changes of direction should be provided directly to the compressor inlet.

While in all of the modifications described herein, the high pressure turbine is used to drive one or more propellers and the low pressure turbine is used to drive the associated compressor, and provide the high velocity propulsion jet, it will be evident that various features of invention herein are applicable to a power plant in which a high pressure turbine may drive the compressor or other equipment and a low pressure turbine may furnish the power to drive a propeller system and be so arranged as to form a high velocity propulsion jet, as described, for example, in said Patent No. 2,428,830. It will be understood, therefore, that, except as expressly limited, the claims herein are generic to these various alternative arrangements.

Furthermore, it will be obvious that various features disclosed herein are applicable to turbines, compressors, superchargers, etc. in general and the claims are to be construed accordingly.

What I claim and desire to protect by Letters Patent is:

1. In combination, a pair of turbines having independent shafts and rotating about parallel and closely adjacent axes, a compressor driven by, and coaxial with, one of said turbines, fuel burning means comprising a chamber in which products of combustion are formed and led to one of said turbines, means for leading gases discharged from one of said turbines to the other to drive the latter, and a passage for air from said compressor to said fuel burning means, said chamber being of scroll form and extending at least partially about both of said axes.

2. In combination, a pair of turbines having independent shafts and rotating about parallel and closely adjacent axes, a compressor driven by, and coaxial with, one of said turbines, fuel burning means comprising a chamber in which products of combustion are formed and led to the other of said turbines, means for leading gases discharged from the last mentioned turbine to the compressor-driving turbine to drive the same, and a passage for air from said compressor to said fuel burning means, said chamber being of scroll form and extending at least partially about both of said axes.

RUDOLPH BIRMANN.

REFERENCES CITED

The following references are of record in the file of this patent:

UNITED STATES PATENTS

| Number | Name | Date |
| --- | --- | --- |
| 767,689 | Hedlund | Aug. 16, 1904 |
| 866,352 | Fullagar et al. | Sept. 17, 1907 |
| 1,027,698 | Curtis | May 28, 1912 |
| 1,111,498 | Rotter | Sept. 22, 1914 |
| 1,154,959 | Banner | Sept. 28, 1915 |
| 1,264,729 | White | Apr. 30, 1918 |
| 1,309,282 | Frame | July 8, 1919 |
| 2,011,420 | Samuelson | Aug. 13, 1935 |
| 2,050,349 | Lysholm et al. | Aug. 11, 1936 |

(Other references on following page)

| Number | Name | Date |
|---|---|---|
| 2,078,957 | Lysholm | May 4, 1937 |
| 2,159,422 | Büchi | May 23, 1939 |
| 2,162,956 | Lysholm | June 20, 1939 |
| 2,164,545 | Rogers | July 4, 1939 |
| 2,165,443 | Berlin | July 11, 1939 |
| 2,173,595 | Schütte | Sept. 19, 1939 |
| 2,216,731 | Birmann | Oct. 8, 1940 |
| 2,292,288 | Pateras Pescara | Aug. 4, 1942 |
| 2,298,663 | Traupel | Oct. 13, 1942 |
| 2,305,311 | Jendrassik | Dec. 15, 1942 |

FOREIGN PATENTS

| Number | Country | Date |
|---|---|---|
| 368,317 | Great Britain | Mar. 4, 1932 |
| 411,787 | Great Britain | June 14, 1934 |
| 413,697 | Great Britain | July 18, 1934 |
| 436,709 | Great Britain | Oct. 16, 1935 |
| 456,980 | Great Britain | Nov. 16, 1936 |
| 464,348 | Great Britain | Apr. 16, 1937 |
| 493,174 | Great Britain | Oct. 4, 1938 |
| 513,751 | Great Britain | Oct. 20, 1939 |
| 398,932 | France | Apr. 6, 1909 |
| 193,319 | Germany | Dec. 30, 1907 |
| 283,057 | Germany | Apr. 10, 1915 |